(12) United States Patent
Nguyen

(10) Patent No.: US 8,814,573 B2
(45) Date of Patent: *Aug. 26, 2014

(54) CUTANEOUS SURGICAL TRAINING MODEL OF THE HEAD, NECK AND SHOULDERS

(71) Applicant: SimSkin, LLC, Chicago, IL (US)

(72) Inventor: Keoni Nguyen, Dayton, OH (US)

(73) Assignee: SimSkin, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,273

(22) Filed: Aug. 13, 2013

(65) Prior Publication Data

US 2014/0045161 A1 Feb. 13, 2014

Related U.S. Application Data

(63) Continuation of application No. 12/646,887, filed on Dec. 23, 2009, now Pat. No. 8,535,062.

(60) Provisional application No. 61/203,365, filed on Dec. 23, 2008.

(51) Int. Cl.
*G09B 23/28* (2006.01)

(52) U.S. Cl.
USPC .......................................... 434/267

(58) Field of Classification Search
USPC ............ 434/262, 267, 269, 272, 274, 275
See application file for complete search history.

(56) References Cited

U.S. PATENT DOCUMENTS

| | | | |
|---|---|---|---|
| 3,916,535 A | 11/1975 | Hewson | |
| 4,386,917 A | 6/1983 | Forrest | |
| 4,481,001 A * | 11/1984 | Graham et al. | 434/267 |
| 4,596,528 A * | 6/1986 | Lewis et al. | 434/270 |
| 4,789,340 A | 12/1988 | Zikria | |
| 5,310,348 A | 5/1994 | Miller | |
| 5,850,033 A * | 12/1998 | Mirzeabasov et al. | 73/12.01 |
| 6,234,804 B1 * | 5/2001 | Yong | 434/267 |
| 6,241,525 B1 * | 6/2001 | Spitalnik | 434/267 |
| 6,957,961 B1 * | 10/2005 | Owens et al. | 434/270 |
| 6,997,719 B2 * | 2/2006 | Wellman et al. | 434/272 |
| 7,272,766 B2 * | 9/2007 | Sakezles | 714/742 |
| 7,322,826 B2 * | 1/2008 | Zeeff | 434/267 |
| 7,549,866 B2 * | 6/2009 | Cohen et al. | 434/267 |
| 7,575,434 B2 | 8/2009 | Palakodeti | |
| 7,699,615 B2 * | 4/2010 | Sakezles | 434/274 |
| 7,931,471 B2 * | 4/2011 | Senagore et al. | 434/267 |

(Continued)

FOREIGN PATENT DOCUMENTS

GB 1567936 A 5/1980

OTHER PUBLICATIONS

Final Program—ACMS, American College of Mohs Surgery, 42nd Mohs College Annual Meeting, Apr. 30-May 3, 2010.

(Continued)

*Primary Examiner* — Kurt Fernstrom
(74) *Attorney, Agent, or Firm* — Dinsmore & Shohl LLP

(57) ABSTRACT

The present invention relates to a high-fidelity three-dimensional surgical training model for demonstrating or practicing surgical techniques. The three-dimensional surgical training model simulates human tissues of the head, neck and shoulders. The three-dimensional surgical training model may comprise a wide variety of defects, including but not limited to various cutaneous defects. The present invention also relates to methods of building and utilizing a three-dimensional surgical training model.

20 Claims, 17 Drawing Sheets

(56) References Cited

U.S. PATENT DOCUMENTS

2002/0098467 A1* 7/2002 Dente .......................... 434/262
2004/0126746 A1 7/2004 Toly
2009/0081627 A1* 3/2009 Ambrozio .................... 434/267
2009/0246747 A1* 10/2009 Buckman, Jr. ............... 434/272

OTHER PUBLICATIONS

International Search Report and Written Opinion dated Aug. 4, 2010 pertaining to Internationial Application No. PCT/US2010/032982.

* cited by examiner

CUTANEOUS SURGICAL TRAINING MODEL OF THE HEAD, NECK AND SHOULDERS

CROSS-REFERENCE TO RELATED APPLICATIONS

This application is filed under 35 U.S.C. §111(a) as a continuation of U.S. application Ser. No. 12/646,887, filed on Dec. 23, 2009 now U.S. Pat. No. 8,535,062, which claims the benefit of U.S. Provisional Application Ser. No. 61/203,365, filed Dec. 23, 2008, the contents of which are hereby incorporated by reference in its entirety.

TECHNICAL FIELD

Embodiments shown and described herein are generally directed to a surgical training model, and more specifically to a three-dimensional surgical training model of the head, neck, and shoulders for demonstrating or practicing surgical techniques, and methods of building, training and utilization thereof.

BACKGROUND

The field of dermatologic surgery is of paramount importance in the surgical arena. As a result of an increase in the incidence of skin cancer in the aging population, there has been an increase in surgical procedures performed in dermatological clinical practice. More specifically, dermatologic surgery has gained importance in the excision and suturing of skin lesions, often in the high risk anatomic locations of the head and neck. While the field of dermatologic surgery has experienced rapid growth in response to the demands of the healthcare system, there is tremendous variation in the surgical training offered and received among dermatology residents and licensed doctors. Thus, improved surgical training is desired.

SUMMARY

One embodiment relates to a three-dimensional surgical training model comprising a skin-simulating layer, a muscle-simulating layer, cartilage-simulating structures, gland-simulating structures, and a skull-simulating structure. The skin-simulating layer comprises cutaneous defect-simulating structures embedded within the skin-simulating layer and blood vessel-simulating structures laminated onto the skin-simulating layer. The muscle-simulating layer comprises artery-simulating structures, nerve-simulating structures, and gland-simulating structures laminated onto the muscle-simulating layer. The muscle-simulating layer further comprises a superficial musculoaponeurotic system-simulating layer laminated onto the muscle-simulating layer, wherein the artery-simulating structures, the nerve-simulating structures, and the gland-simulating structures are subjacent to the superficial musculoaponeurotic system-simulating layer and are superficial to the muscle-simulating layer. The muscle-simulating layer is laminated onto the skin-simulating layer and onto the skull-simulating layer.

Another embodiment relates to a method of building a three-dimensional surgical training model from a negative mold, comprising laminating a skin-simulating layer onto the negative mold, fabricating a muscle-simulating layer, laminating artery-simulating structures onto the muscle-simulating layer, laminating nerve-simulating structures onto the muscle-simulating layer, laminating a superficial musculoaponeurotic system-simulating structure onto the muscle-simulating layer, laminating gland-simulating structures onto the skin-simulating layer, fabricating a skull-simulating structure, laminating the muscle-simulating layer onto the skull-simulating structure, laminating cartilage-simulating structures onto the skull-simulating structure, laminating the skull-simulating structure onto the skin-simulating layer, and removing the three-dimensional surgical training model from the negative mold.

Yet another embodiment relates to a method of training medical practitioners, comprising providing a three-dimensional surgical training model and performing surgical techniques upon the three-dimensional surgical training model.

Still yet another embodiment relates to a method of using a three-dimensional surgical training model, comprising performing surgical techniques on the surgical training model.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements, as well as conventional parts removed, to help to improve understanding of the various embodiments of the present invention.

DETAILED DESCRIPTION

The present invention relates to a three-dimensional surgical training model for demonstrating or practicing surgical techniques. The three-dimensional surgical training model (hereinafter "surgical training model") simulates human tissues of the head, neck and shoulders. The surgical training model may comprise a wide variety of defects, including but not limited to various cutaneous defects. As used herein, the term "cutaneous" means relating to or existing on or affecting the skin. The present invention also relates to methods of building and utilizing a three-dimensional surgical training model. The present invention further comprises a method of training medical practitioners.

The surgical training model disclosed herein is high-fidelity. As used herein, "high fidelity" indicates an accurate simulation of the anatomy and physical properties of human tissue.

The present invention comprises a surgical training model that simulates human tissues of a human head, neck, and shoulders in approximate proportion to a human head, neck and shoulders. The present invention may also comprise surgical training models that simulate human tissues of only the human head and neck, or human tissues of only the head. The surgical training model may comprise a variety of cutaneous defects, including but not limited to lesions and/or wounds. As used herein, "lesion" means any localized abnormal structural change and "wound" means any injury to living tissue.

The surgical training model comprises tissue-simulating layers. In one particular embodiment, the tissue-simulating layers may comprise a skin-simulating layer, blood vessel-simulating structures, cutaneous defect-simulating structures, a muscle-simulating layer, artery-simulating structures, nerve-simulating structures, a superficial musculoaponeurotic system-simulating structure, gland-simulating structures, cartilage-simulating structures and/or skull-simulating structures, and combinations thereof.

Figure 1:
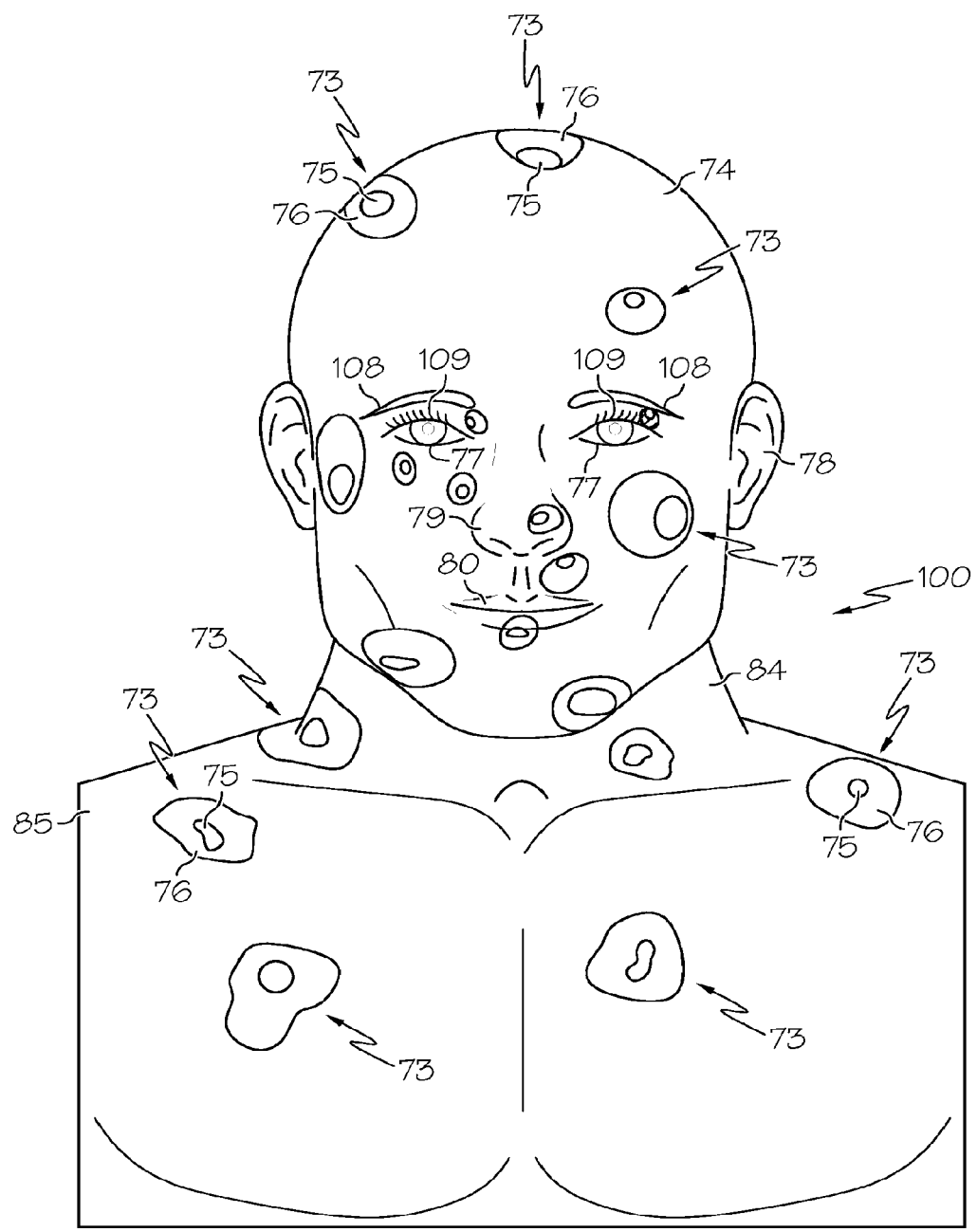
FIG. 1 is a front view of a three-dimensional surgical training model with a variety of tumors disposed thereon.
Figure 2:
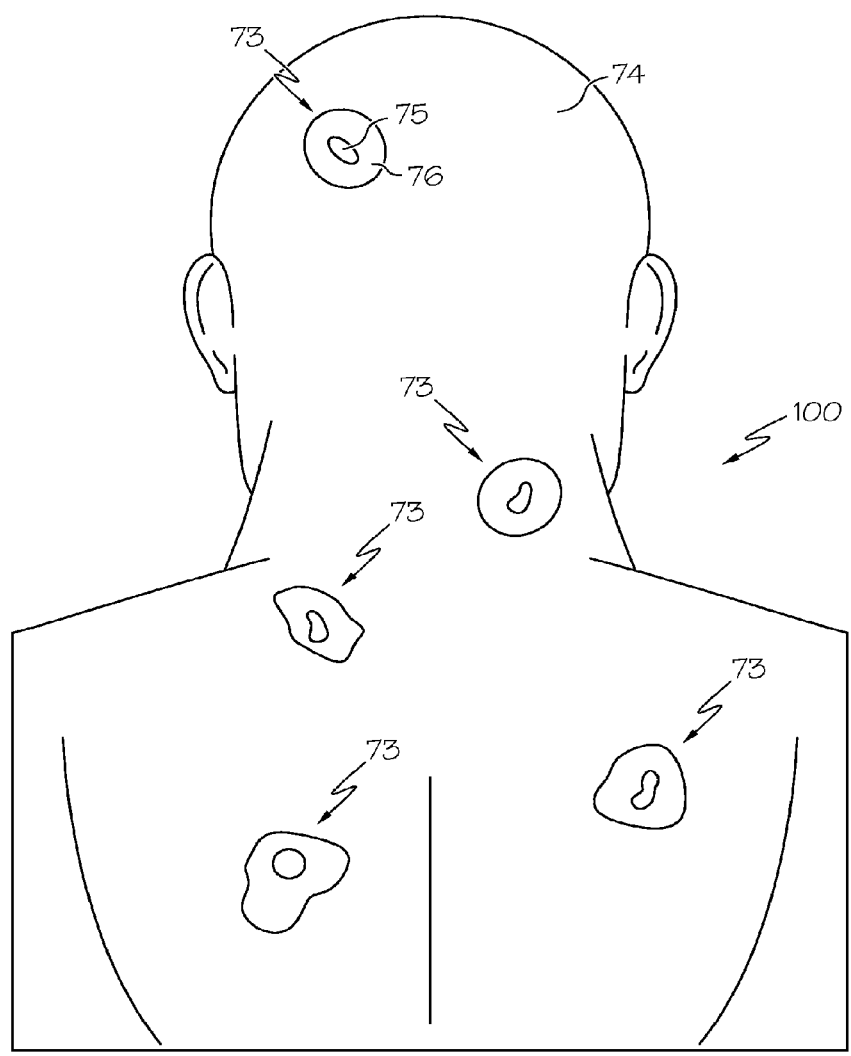
FIG. 2 is a back view of the training model of FIG. 1 with a variety of tumors disposed thereon.

Referring first to FIGS. 1 and 2, in one embodiment, the surgical training model 100 simulates human tissues of the head 74, neck 84, and shoulders 85, wherein one or more tissue layers of the head 74, neck 84 and shoulders 85 of the surgical training model 100 are simulated in approximate proportion to human tissues of a human head, neck and shoulders. The surgical training model 100 may include one or more tissues, including skin layers, fatty layer(s), muscles, blood vessels, nerves, glands, bone, cartilage, and/or other tissues and body parts. In this embodiment, the surgical training model 100 is fabricated to be anatomically correct, or at least substantially anatomically correct, as to the layers of tissues, including but not limited to skin-simulating layer 2, blood vessel-simulating structures 112, a muscle-simulating layer(s) 7, artery-simulating structures 90, nerve-simulating structures 93, a superficial musculoaponeurotic system-simulating layer 94, gland-simulating structures 96, cartilage-simulating structures 95, and a skeleton-simulating structure 8 (e.g., skull-simulating structure). As such, the surgical training model 100 also comprises a head 74, neck 84, shoulders 85, eyes 77, ears 78, nose 79, and mouth 80, which may comprise or make up of one or more of these layers and/or structures. It is understood that the surgical training model 100 may comprise one or more of the head 74, neck 84, shoulders 85, eyes 77, ears 78, nose 79, mouth 80, skin-simulating layer 2, blood vessel-simulating structures 112, a muscle-simulating layer(s) 7, artery-simulating structures 90, nerve-simulating structures 93, a superficial musculoaponeurotic system-simulating layer 94, gland-simulating structures 96, cartilage-simulating structures 95, and/or a skeleton-simulating structure 8.

Still referring to FIGS. 1 and 2, the surgical training model 100 may comprise one or more of various cutaneous defect-simulating structures 73, including but not limited to lesions, wounds, cysts, lymphomas, scars, and combinations thereof. As shown in FIGS. 1 and 2, the surgical training model 100 comprises a plurality of cutaneous defect-simulating structures 73 distributed substantially throughout or all over the surgical training model 100, including lesions that comprise tumors 75 and tumor margins 76. Cutaneous defect-simulating structures 73 may be arranged within the surgical training model 100 in high-risk anatomical areas, including but not limited to the head 74 and neck 84. Cutaneous defects may also be arranged within the surgical training model 100 in areas wherein surgical techniques may result in deformation of one or more of the skin-simulating layers and/or the underlying tissue layers. For example, the suture process may result in deformation of skin, in the form of buckling. The incidence of buckling increases in areas surrounding the eyes 77 and the mouth 80.

Thus, the surgical training model 100 provides medical practitioners and others, and more specifically provides surgical residents and fellows, a device upon which to practice surgical techniques in high risk anatomic locations and in areas wherein surgical techniques may result in deformation of the skin. The surgical training model 100 provides medical practitioners an opportunity to practice surgical techniques on a synthetic model prior to encountering live patients. Examples of the surgical techniques that a medical practitioner may perform or practice on the surgical training model 100 may include, but should not be limited to, excisions, closures, and/or cosmetic procedures, and combinations thereof.

Referring to FIGS. 4A, 4B, 5, 7, 8, and 9 and as set forth above, the surgical training model 100 comprises a skin-simulating layer 2, blood vessel-simulating structures 112, a muscle-simulating layer 7, artery-simulating structures 90, nerve-simulating structures 93, a superficial musculoaponeurotic system-simulating layer 94, gland-simulating structures 96, cutaneous defect-simulating structures 73, cartilage-simulating structures 95, and a skull-simulating structure 8.

The skin-simulating layer 2 comprises a high-fidelity model of human skin. The skin-simulating layer 2 is high-fidelity in that it possesses one or more of the physical properties of human skin, including but not limited to high tensile strength and elongation. As such, the skin-simulating layer 2 provides medical practitioners and others, and more specifically surgical residents and fellows, a device upon which to perform a plethora of surgical techniques under realistic conditions. For example, the skin-simulating layer 2 of the surgical training model 100 provides a device upon which surgical residents and fellows may perform complex closure techniques of high tension on the head 74 and neck 84 of greater than about 40 mm in diameter without the risk of tearing through the skin-simulating layer. The skin-simulating layer 2 comprises an epidermis-simulating layer 3 which is the outermost layer of the surgical training model 100, a dermis-simulating layer 97 adjacent to the epidermis-simulating layer 3, comprising an upper dermis-simulating layer and a lower dermis-simulating layer 5, and a subcutaneous-simulating layer 6 disposed inwardly from the dermis-simulating layer 97.

In one embodiment, the epidermis-simulating layer 3 may comprise one or more materials, including but not limited to plastics, polymers, composites, other materials, additives, and/or combinations thereof. In certain embodiments, the epidermis-simulating layer 3 may comprise elastomeric materials such as, for example, elastomers (synthetic and natural), rubbers (synthetic and natural), polyisobutene, polyisoprene, polysiloxane, polyetherurethane, polyurethane, other materials (known or yet-to-be discovered), additives, and/or combinations thereof such that the epidermis-simulating layer 3 possesses similar or the same characteristics, such as substantially the same or similar tensile strength and/or elongation at break point as that of the actual epidermal layer in humans. As such, the epidermis-simulating layer 3 may be comprised of an elastomeric material having a tensile strength from about 150 psi (about 1.0 MPa) to about 500 psi (about 3.4 MPa), in another embodiment from about 225 psi (about 1.5 MPa) to about 500 psi (about 3.4 MPa), in another embodiment from about 300 psi (about 2.1 MPa) to about 500 psi (about 3.4 MPa), in still another embodiment from about 400 psi (about 2.8 MPa) to about 500 psi (about 3.4 MPa), and still yet another embodiment from about 450 psi (about 3.1 MPa) to about 500 psi (about 3.4 MPa), and an elongation at break point from about 700% to about 1100%, in another embodiment from about 800% to about 1100%, in still another embodiment from about 900% to about 1100%, or in still yet another embodiment from about 950% to about 1100%.

In one embodiment, the epidermis-simulating layer 3 comprises a mixture of a polysiloxane, more particularly a platinum polysiloxane derivative, with a polysiloxane containing an amorphous silica composition, in a ratio of 1:1, respectively. In a further embodiment, the platinum polysiloxane derivative comprises PlatSil Gel 10 and the polysiloxane derivative containing the amorphous silica composition may comprise a silicone rubber, more particularly Dragon Skin® 10 Fast. PlatSil Gel 10 has a tensile strength of approximately 228 psi (about 1.57 MPa) and an elongation at break point of about 970%. Dragon Skin® 10 Fast comprises a tensile strength of approximately 475 psi (about 3.2 MPa) and an elongation at break point of about 1000%. To simulate the tensile strength and elongation at break point of the human epidermal tissue, PlatSil Gel 10 is combined with Dragon Skin® 10 Fast.

PlatSil Gel 10 has a cure time of about 4 to about 5 minutes. Conversely, Dragon Skin® 10 Fast has a cure time of about 8 to about 10 minutes. Thus, in one particular embodiment wherein the epidermis-simulating layer 3 comprises a combination of PlatSil Gel 10 and Dragon Skin® 10 Fast, a retarder may be added in order to equalize the cure times of PlatSil Gel 10 and Dragon Skin® 10 Fast. In one particular embodiment, the retarder may comprise about 1% PlatSil 71 & 73 R Retarder. In this particular embodiment, the retarder acts to double the cure time of PlatSil Gel 10 so that it is approximately equal to the cure time of Dragon Skin® 10 Fast, i.e. about 8 minutes to about 10 minutes.

In one particular embodiment, the epidermis-simulating layer 3 comprises a polysiloxane softener. In a further embodiment, the polysiloxane softener comprises a pure silicone compound, and more particularly comprises about 100% dimethyl silicone fluid. In still a further embodiment, the silicone compound comprises about 100% dimethyl silicone fluid and Smith's Deadener. In one particular embodiment, the epidermis-simulating layer 3 comprises a mixture of about 42.5% PlatSil Gel 10 (i.e. about 42.5% of the total volume), about 42.5% Dragon Skin® 10 Fast (i.e. about 42.5% of the total volume), about 10% of about 100% dimethyl silicon fluid (i.e. about 10% of the volume of PlatSil Gel 10 and Dragon Skin® 10 Fast), about 5% Smith's Deadener (i.e. about 5% of the volume of PlatSil Gel 10), and about 1% PlatSil 71 & 73 R Retarder (i.e. about 1% of the volume of PlatSil Gel 10).

In one particular embodiment, the epidermis-simulating layer 3 further comprises a synthetic polymer layer, and more particularly comprises a polyfiber layer. The polyfiber layer adds support to the epidermis-simulating layer. In one particular embodiment, the polyfiber layer comprises SF-8 Supreme Polyfiber.

In one embodiment, the thickness of the epidermis-simulating layer 3 is about 0.5 mm to about 1.0 mm. The epidermis-simulating layer 3 may further comprise the addition of a dye to simulate the pigmentation of human epidermal tissue. In one particular embodiment, the dye is an oil-based flesh tone pigment.

Still referring to FIGS. 4A, 4B, 5, 7, 8, and 9 and as set forth above, the dermis-simulating layer 97 is subjacent to the epidermis-simulating layer 3. The dermis-simulating layer 97 may comprise one or more materials, including but not limited to plastics, polymers, composites, other materials, additives, and/or combinations thereof. In certain embodiments, the dermis-simulating layer 4 may comprise elastomeric materials such as, for example, elastomers (synthetic and natural), rubbers (synthetic and natural), polyisobutene, polyisoprene, polysiloxane, polyetherurethane, polyurethane, other materials (known or yet-to-be discovered), additives, and/or combinations thereof such that the dermis-simulating layer 4 possesses similar or the same characteristics, such as substantially the same or similar tensile strength and/or elongation at break point as that of the actual dermal layer in humans. In one embodiment, the dermis-simulating layer 4 comprises two sublayers: an upper dermis-simulating layer 4 and a lower dermis-simulating layer 5. In one particular embodiment, the upper dermis-simulating 4 layer comprises a polysiloxane, and more particularly comprises Dragon Skin® 10 Fast. In a further embodiment, the upper dermis-simulating layer comprises Dragon Skin® 10 Fast, a polysiloxane softener, which is more particularly about 100% dimethyl silicone fluid. In one specific embodiment, the upper dermis-simulating layer comprises about 90% Dragon Skin® 10 Fast and about 10% of about 100% dimethyl silicone fluid.

The upper dermis-simulating layer 4 may comprise a polyfiber layer. The polyfiber layer adds support to the upper dermis-simulating layer. The polyfiber layer may comprise a synthetic polymer. In one particular embodiment, the polyfiber layer comprises SF-8 Supreme Polyfiber. In one embodiment, the thickness of the upper dermis-simulating layer is about 0.5 mm to about 1 mm.

The lower dermis-simulating layer 5 comprises at least one polyamide layer. The lower dermis-simulating layer 5 is subjacent to the upper dermis-simulating layer 4. In one particular embodiment, the at least one polyamide layer comprises polyamide mesh. In a further embodiment, the polyamide mesh is 15 Denier.

The lower dermis-simulating layer 5 may comprise blood vessel-simulating structures 112 disposed therein. Blood vessel-simulating structures simulate bleeding on the performance of surgical techniques upon the surgical training model 100. In one embodiment, a plurality of blood vessel-simulating structures are incorporated into the lower dermis-simulating layer 5 by laminating at least one filament onto the polyamide mesh. In a further embodiment, the blood vessel-simulating structures are incorporated into the lower dermis-simulating layer 5 by laminating at least one filament onto approximately three layers of polyamide mesh with Dragon Skin® 10 Fast. The filaments are arranged in their correct anatomical positions, such that they extend substantially radially outward from the top of the skull-simulating structure 8. The at least one filament extends from the surgical training model 100 through an aperture defined by of the surgical training model 100. The at least one filament is removed after lamination of the entire surgical training model 100, thus creating a channel and/or cavity defined by the Dragon Skin® 10 Fast. Upon removal, synthetic blood may be injected into the blood vessel-simulating structures to simulate bleeding upon performance of surgical techniques on the surgical training model 100. As used herein, the term "filament" means a fibril or a slender natural or synthetic fiber.

Upon incorporating blood vessel-simulating structures into the lower dermis-simulating layer 5, at least one layer of polyamide mesh is laminated onto the blood vessel-simulating structures incorporated into the lower dermis-simulating layer 5. In one particular embodiment, approximately eleven layers of polyamide mesh are laminated onto the blood vessel-simulating structures incorporated into the lower dermis-simulating layer 5. The polyamide mesh may be laminated with Dragon Skin® 10 Fast.

In one embodiment, the thickness of the lower dermis-simulating layer 5 is about 1.0 mm to about 1.5 mm. The dermis-simulating layer 97 may further comprise the addition of a dye to simulate the pigmentation of a human dermal tissue. In one particular embodiment, the dye is an oil-based flesh-tone pigment, lighter than the pigmentation of the epidermis-simulating layer 3.

Because tumors 75 do not extend through the skin-simulating layer 2, upon curing of the dermis-simulating layer 97, tumor margins 76 may be painted onto the subjacent side of the dermis-simulating layer 97 to simulate the volume of human tumors. In one particular embodiment, the tumor margins 76 may be painted light green. Tumor margins 76 may vary in size from about 4 mm to about 15 mm in diameter.

In one embodiment, the combined thickness of the epidermis-simulating layer 3 and the dermis-simulating layer 97 is from about 2.0 mm to about 3.5 mm. In one embodiment, the epidermis-simulating layer 3 and the dermis-simulating layer 97 may have a combined tensile strength from about 10 MPa to about 20 MPa, in another embodiment from about 13 MPa to about 20 MPa, in yet another embodiment from about 15 MPa to about 20 MPa, in yet another embodiment from about 16 MPa to about 20 MPa, in still yet another embodiment from about 15.13 MPa to about 16.89 MPa.

With regard to elongation, in one embodiment, the epidermis-simulating layer 3 and the dermis-simulating layer 97 may have an elongation at break point of from about 50% to about 100% of the original length and in addition to the original length of the epidermis-simulating layer 3 and the dermis-simulating layer 97, in another embodiment from about 60% to about 100% of the original length and in addition to the original length, in yet another embodiment from about 70% to about 100% of the original length and in addition to the original length, in still another embodiment from about 75% to about 100% of the original length and in addition to the original length.

In one specific embodiment, the combined thickness of the epidermis-simulating layer 3 and the dermis-simulating layer 97 is about 1.3 mm to about 1.6 mm, the tensile strength is from about 15.13 MPa to about 16.89 MPa, the elongation at break point is from about 77.39% to about 85.45% of the original length and in addition to the original length, and the Young's Modulus was from about 12.76 MPa to about 18.4 MPa. In this particular embodiment, the measurements were obtained from an Instron E3000 wherein a sample of the epidermis-simulating layer 3 and the dermis-simulating layer 97 was tested. The sample tested had a width from about 14.01 mm to about 19.69 mm in width.

Still referring to FIG. 4, the cutaneous defect-simulating structures 73 are disposed within the epidermis-simulating layer 3. As such, the cutaneous defect-simulating structures extend up through a surface of the outer-most epidermis-simulating layer 3. These cutaneous defect structures 73 may even extend above the surface, providing a raised or protruding structure on the surface of the epidermis-simulating layer 3. The cutaneous defect-simulating structures 73 may range in size from about 10 mm to about 50 mm and may be embedded in critically high risk anatomic locations of the surgical training model 100 (e.g., near the eyes 77, nose 79, mouth 80, etc.).

The cutaneous defect-simulating structures 73 may comprise one or more materials, including but not limited to plastics, polymers, composites, other materials, additives, and/or combinations thereof. In certain embodiments, the cutaneous defect-simulating structures 73 may comprise elastomeric materials such as, for example, elastomers (synthetic and natural), rubbers (synthetic and natural), polyisobutene, polyisoprene, polysiloxane, polyetherurethane, polyurethane, other materials (known or yet-to-be discovered), additives, and/or combinations thereof such that the cutaneous defect-simulating structures 73 possess similar or the same characteristics, such as substantially the same or similar tensile strength, and/or elongation at break point as that of typical cutaneous defects (e.g., tumors, lesions, wounds, scars, etc.) in humans.

The subcutaneous-simulating layer 6 is subjacent to the dermis-simulating layer 97. The subcutaneous-simulating layer 6 may comprise an elastomer of low compression and hardness to a durometer reading of about 0. In one embodiment, the subcutaneous-simulating layer 6 may comprise one or more materials, including but not limited to plastics, polymers, composites, other materials, additives, and/or combinations thereof. In certain embodiments, the subcutaneous-simulating layer 6 may comprise elastomeric materials such as, for example, elastomers (synthetic and natural), rubbers (synthetic and natural), polyisobutene, polyisoprene, polysiloxane, polyetherurethane, polyurethane, other materials (known or yet-to-be discovered), additives, and/or combinations thereof such that the subcutaneous-simulating layer 6 possesses similar or the same characteristics, such as substantially the same or similar tensile strength, and/or elongation at break point as that of actual subcutaneous layer in humans.

In one particular embodiment, the subcutaneous-simulating layer 6 comprises a mixture of polysiloxane with a polysiloxane softener. In a further embodiment, the polysiloxane comprises PlatSil Gel 10 and the polysiloxane softener comprises a mixture of 100% trimethyl silicone fluid and Smith's Deadener. In still a further embodiment, the silicone compound comprises about 100% dimethyl silicone fluid and Smith's Deadener. In one specific embodiment, the subcutaneous-simulating layer 6 comprises about PlatSil Gel 10, about 280% Smith's Deadener (i.e. about 280% of the volume of PlatSil Gel 10), and about 10% of about 100% trimethyl silicone fluid (i.e. about 10% of the volume of PlatSil Gel 10).

In one embodiment, the thickness of the subcutaneous-simulating layer 6 is from about 1 mm to about 10 mm. The subcutaneous-simulating layer 6 may further comprise the addition of a dye to simulate the pigmentation of human subcutaneous tissue. In one particular embodiment, the dye is oil-based, and in a further embodiment, the dye comprises red and yellow oil-based pigments.

In one particular embodiment, the skin-simulating layer 2, which epidermis-simulating layer 3, dermis-simulating layer 97, and subcutaneous-simulating layer 6, of an embodiment of the surgical training model 100 has a tensile strength of from about 16 MPa to about 20 MPa, an elongation at break of from about 65% to about 75%, and a durometer hardness of from about 4 to about 6.

Figure 5:
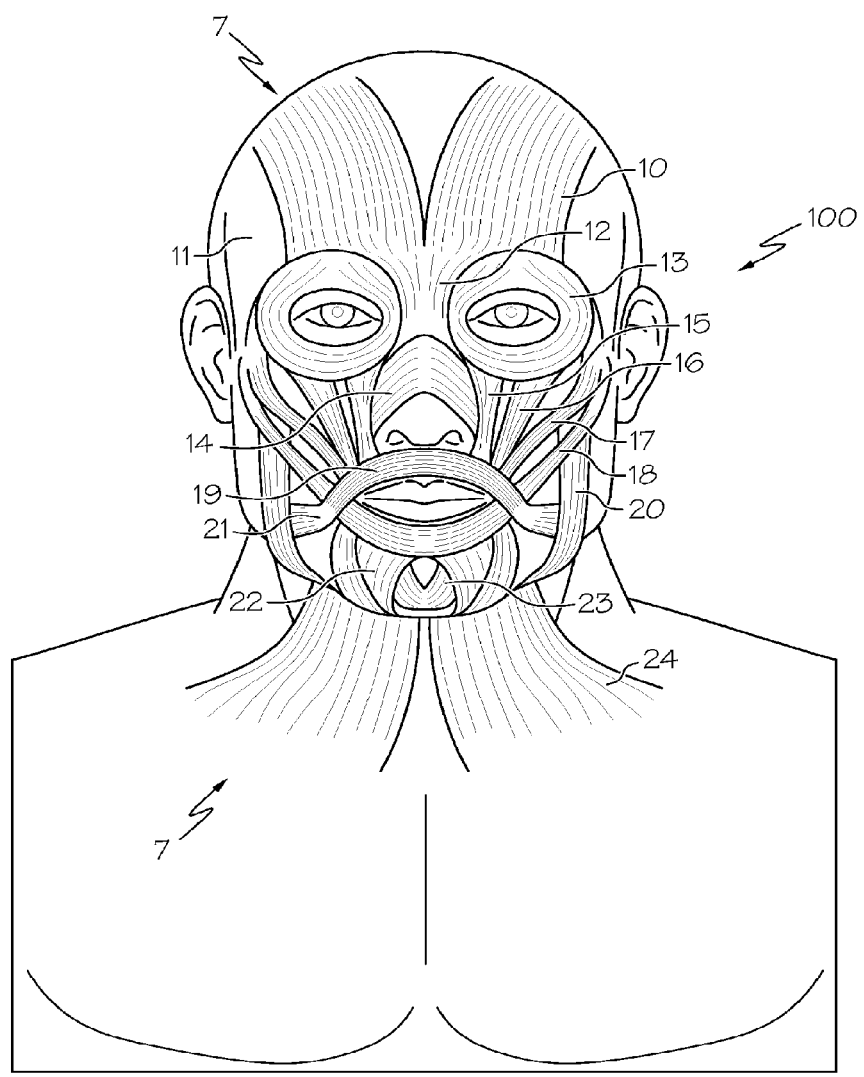
FIG. 5 is a front view of the training model of FIG. 1, depicting a variety of superficial muscles of the head, neck, and shoulders.

Referring to FIG. 5, the surgical training model 100 is illustrated without the skin-simulating layer 2 in order to show the muscle-simulating layer 7. The muscle-simulating layer 7 is subjacent to the subcutaneous-simulating layer 6. The muscle-simulating layer 7 simulates superficial muscles of the head and neck, including, but not limited to, the frontal 10, occipital 11, procerus 12, orbicularis oculi 13, transverse nasalis 14, levator labii superioris alaeque nasi 15, levator labii superioris 16, zygomaticus minor 17, zygomaticus major 18, orbicularis oris 19, buccinator 20, depressor anguli oris 21, depressor labii inferioris 22, mentalis 23, and platysma 24.

The muscle-simulating layer 7 may comprise one or more materials, including but not limited to plastics, polymers, composites, other materials, additives, and/or combinations thereof. In certain embodiments, the muscle-simulating layer 7 may comprise elastomeric materials such as, for example, elastomers (synthetic and natural), rubbers (synthetic and natural), polyisobutene, polyisoprene, polysiloxane, polyetherurethane, polyurethane, other materials (known or yet-to-be discovered) such as alginate, additives, and/or combinations thereof such that the muscle-simulating layer 7 possesses similar or the same characteristics, such as substantially the same or similar tensile strength, and/or elongation at break point as that of actual muscle tissues in humans. In one embodiment, the muscle-simulating layer 7 comprises a mixture of an elastomer of high tensile strength and alginate to a durometer hardness of about 10 to about 12.

In one embodiment, the muscle-simulating layer 7 comprises a combination of a polysiloxane, a polysiloxane softener, and alginate. In a further embodiment, the polysiloxane is PlatSil Gel 10, the polysiloxane softener is a mixture of about 100% dimethyl silicone fluid and Smith's Deadener, and the alginate is alginate powder, and is more particularly Accu-Cast 380 CC Alginate. In still a further embodiment, the muscle-simulating layer 7 comprises about 70% PlatSil Gel 10, about 10% Smith's Deadener, about 10% dimethyl silicone fluid, and about 10% Accu-Cast 380 CC Alginate. The muscle-simulating layer 7 may further comprise the addition of a dye to simulate the pigmentation of human muscle tissue. In a further embodiment, dye may be added to the muscle-simulating layer 7 to simulate the pigmentation of human muscle tissues. In one particular embodiment, the dye is oil-based, and in a further embodiment, the dye comprises red and brown oil-based pigments.

Figure 7:
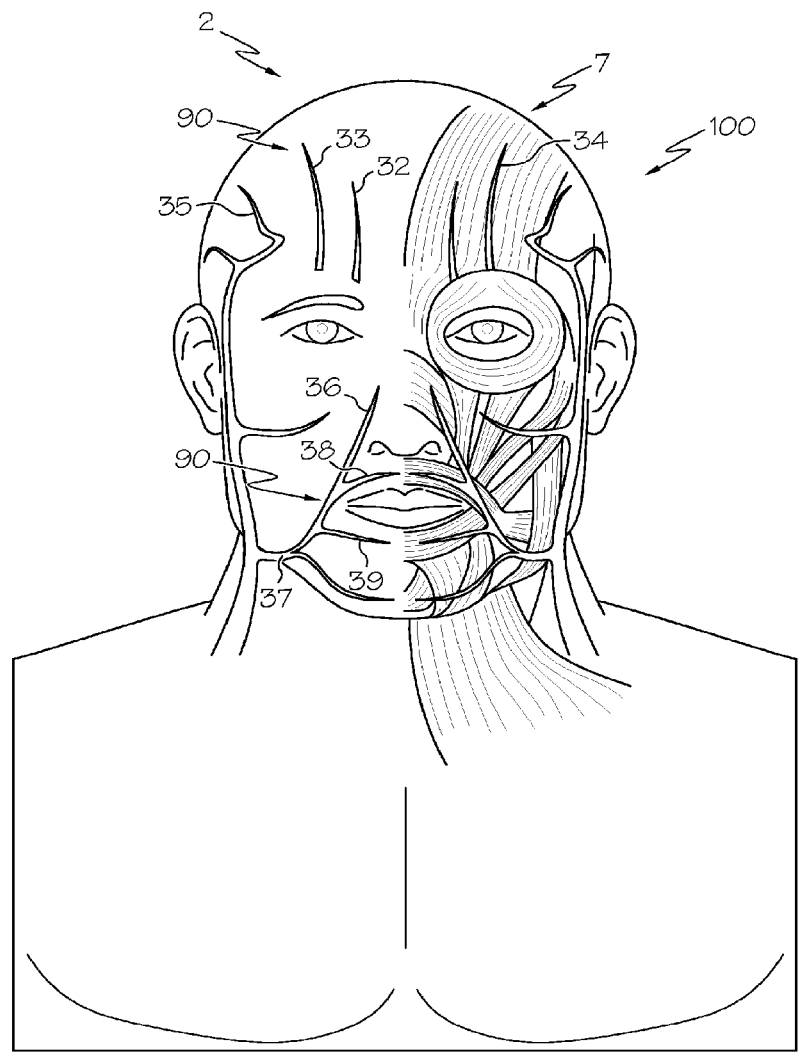
FIG. 7 is a front view of the training model of FIG. 1, depicting a variety of blood vessel-simulating structures and artery-simulating structures of the face.

Referring to FIG. 7, the surgical training model 100 is shown with the skin-simulating layer 2 and the muscle-simulating layer 7 removed in order to show the artery-simulating structure(s) 90. In the embodiment shown, the artery-simulating structures 90 comprise superficial blood vessels of the face. The artery-simulating structures are arranged within the surgical training model 100 in their correct anatomical positions. The artery-simulating structures 90 of the face include but should not be limited to the supratrochlear artery 32, the supraorbital artery 33, the temporal artery 35, the opthalmic artery, the angular artery 36, the transverse facial artery 37, the superior labial artery 38, and the inferior labial artery 39.

The artery-simulating structures 90 may comprise one or more materials, including but not limited to plastics, polymers, composites, filaments, filaments encompassed, encircled, or embedded within polymer or composite materials, other materials, additives, and/or combinations thereof. In certain embodiments, the artery-simulating structures 90 may comprise elastomeric materials such as, for example, elastomers (synthetic and natural), rubbers (synthetic and natural), polyisobutene, polyisoprene, polysiloxane, polyetherurethane, polyurethane, polyamide, other materials (known or yet-to-be discovered), additives, and/or combinations thereof such that the artery-simulating structures 90 possesses similar or the same characteristics, such as substantially the same or similar tensile strength and/or elongation at break point as that of actual arteries in humans. In one embodiment, the artery-simulating structures 90 are individually composed and are laminated onto the muscle-simulating layer 7, prior to lamination of the muscle-simulating layer 7 onto the subcutaneous-simulating layer 6.

In one particular embodiment, the artery-simulating structures 90 comprise polysiloxane. In a further embodiment, the artery-simulating structures 90 comprise Dragon Skin® 10 Fast. The artery-simulating structures 90 are individually composed with Dragon Skin® 10 Fast and polyamide mesh encircling a filament in an artery simulating-structures 90 mold. In one particular embodiment, the filament is fishing line having a diameter of about 2 mm. After the Dragon Skin® 10 Fast cures, the filament is removed. Upon removal of the filament, a channel and/or cavity defined by the Dragon Skin® 10 Fast are created. Synthetic blood may be injected into the artery-simulating structures to simulate bleeding upon performance of surgical techniques on the surgical training model 100. Upon removal of the filament, the artery-simulating structures 90 are laminated onto the muscle-simulating layer 7 in their correct anatomical positions.

Figure 8:
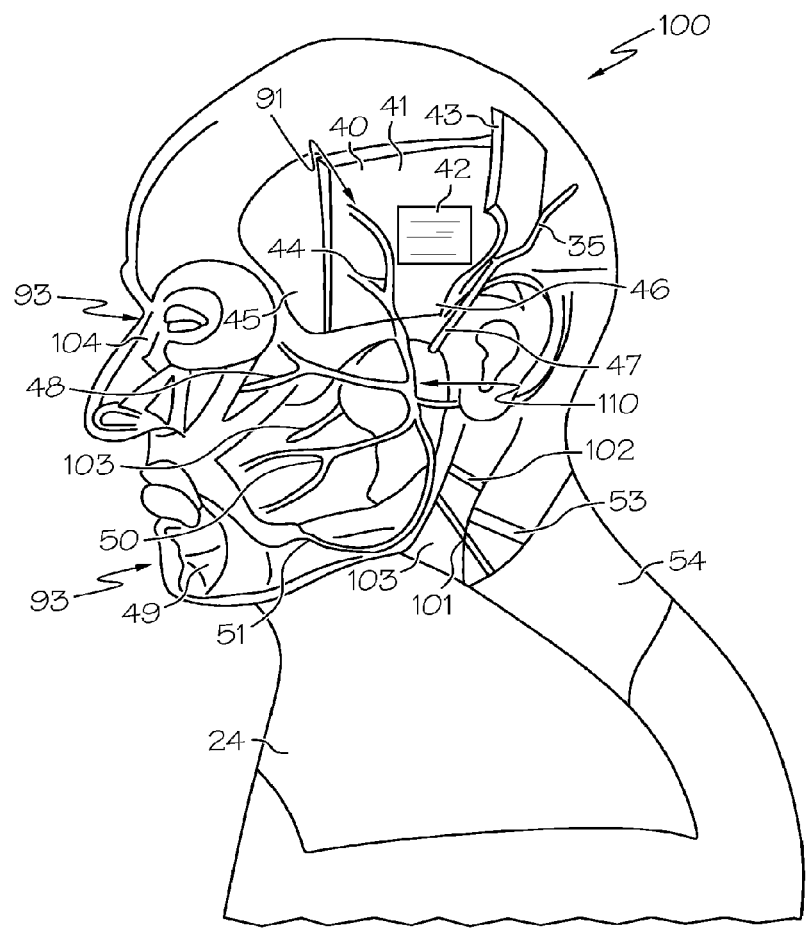
FIG. 8 is a side elevational view of the training model of FIG. 1, depicting a variety of nerve-simulating structures and gland-simulating structures of the head and neck.

Referring to FIG. 8, the nerve-simulating structures 93 are shown. The nerve-simulating structures 93 are laminated onto the muscle-simulating layer 7 in their correct anatomical positions. The nerve-simulating structures 93 may include but should not be limited to the temporal 44, zygomatic 48, buccal 50, mandibular 51, cervical 101, auricular 102, and the spinal accessory 53. The branches of the facial nerve 110 include the temporal 44, zygomatic 48, buccal 50, mandibular 51, and cervical 101. The auricular nerve 102 is used to identify the spinal accessory nerve 53 as it emerges from the posterior margin of the sternocleidomastoid muscle 103 and the anterior border of the trapezius muscle 54.

The nerve-simulating structures 93 may comprise one or more materials, including but not limited to plastics, polymers, composites, filaments, filaments encompassed, encircled, or embedded within polymer or composite materials, other materials, additives, and/or combinations thereof. In certain embodiments, the nerve-simulating structures 93 may comprise elastomeric materials such as, for example, elastomers (synthetic and natural), rubbers (synthetic and natural), polyisobutene, polyisoprene, polysiloxane, polyetherurethane, polyurethane, polyamide, other materials (known or yet-to-be discovered), additives, and/or combinations thereof such that the nerve-simulating structures 93 possesses similar or the same characteristics, such as substantially the same or similar tensile strength and/or elongation at break point as that of actual nerves in humans.

In one embodiment, the nerve-simulating structures 93 are composed of a filament embedded in an elastomer as set forth above. In one particular embodiment, the filament is yarn and the elastomer is Dragon Skin® 10 Fast. In a further embodiment, the yarn is about 0.5 mm thick, and in still a further embodiment, the yarn is yellow.

Referring to FIG. 9, the superficial musculoaponeurotic system-simulating layer 94 is shown. The superficial musculoaponeurotic system-simulating layer 94 may comprise one or more materials, including but not limited to plastics, polymers, composites, filaments, filaments encompassed, encircled, or embedded within polymer or composite materials, other materials, additives, and/or combinations thereof. In certain embodiments, the superficial musculoaponeurotic system-simulating layer 94 may comprise elastomeric materials such as, for example, elastomers (synthetic and natural), rubbers (synthetic and natural), polyisobutene, polyisoprene, polysiloxane, polyetherurethane, polyurethane, polyamide, other materials (known or yet-to-be discovered), additives, and/or combinations thereof such that the superficial musculoaponeurotic system-simulating layer 94 possesses similar or the same characteristics, such as substantially the same or similar tensile strength, and/or elongation at break point as that of the actual superficial musculoaponeurotic system in humans. The superficial musculoaponeurotic system-simulating layer 94, in one embodiment, may comprise an elastomer and polyamide mesh.

In one embodiment, the superficial musculoaponeurotic system-simulating layer 94 is laminated onto the muscle-simulating layer 7, such that the artery-simulating structures 90 and the nerve-simulating structures 93 are in their correct anatomical positions subjacent to or superficial to the superficial musculoaponeurotic system-simulating layer 94. In one embodiment, the superficial musculoaponeurotic system-simulating layer comprises polyamide mesh and polysiloxane. In still a further embodiment, the polyamide mesh is about 30 Denier and the polysiloxane is Dragon Skin® 10 Fast. In the exemplary embodiment shown, the superficial musculoaponeurotic system-simulating layer 94 is laminated over the temporalis muscle 42, platysma muscle 55, obicularis oculi muscle 13, occipitofrontalis muscle 11, zygomatici muscles 17, 18, levator labii superioris muscle 19, and temporal branches 44 of the facial nerve 110. In an alternative embodiment, the superficial musculoaponeurotic system-simulating layer 94 may comprise only a polyamide mesh.

Figure 6A:
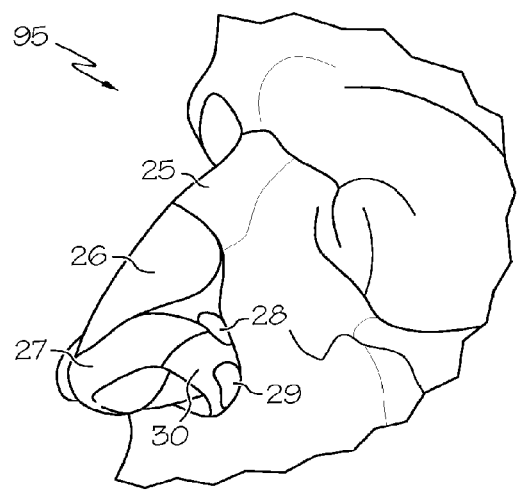
FIG. 6A is a perspective view of the nasal cartilage of the training model of FIG. 1.
Figure 6B:
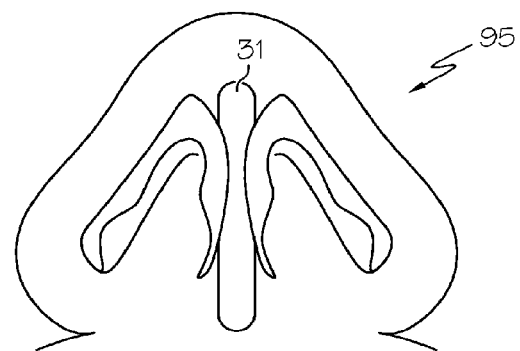
FIG. 6B is a bottom perspective view of the nasal cartilage of the training model of FIG. 1.

Referring to FIGS. 6A and 6B, the cartilage-simulating structures 95 are subjacent to the muscle-simulating layer 7. The cartilage-simulating structures 95 comprise nasal cartilage-simulating structures 120 and auricular cartilage-simulating structures (not shown). The nasal cartilage-simulating structures 120 include but are not limited to septal cartilage 31, lateral crus of the major alar cartilage 27, and minor alar cartilage 28. The cartilage-simulating structures 95 also comprise the lateral fibro-fatty tissue 30.

The cartilage-simulating structures (not shown) may comprise one or more materials, including but not limited to plastics, polymers, composites, filaments, filaments encompassed, encircled, or embedded within polymer or composite materials, other materials, additives, and/or combinations thereof. In certain embodiments, the cartilage-simulating structures (not shown) may comprise elastomeric materials such as, for example, elastomers (synthetic and natural), rubbers (synthetic and natural), polyisobutene, polyisoprene, polysiloxane, polyetherurethane, polyurethane, other materials (known or yet-to-be discovered) such as gypsum cement and/or alginate, additives, and/or combinations thereof such that the cartilage-simulating structures (not shown) possesses similar or the same characteristics, such as substantially the same or similar tensile strength and/or elongation at break point as that of actual cartilage in humans. In one embodiment, the cartilage-simulating structures comprise a mixture of elastomer, alginate, and gypsum cement to a durometer hardness of about 20.

In one particular embodiment, the nasal cartilage-simulating structure 120 and auricular cartilage-simulating structure (not shown) comprise about 50% PlatSil Gel 10, about 25% gypsum cement, and about 25% alginate. In another embodiment, the cartilage-simulating structures 95 further comprise gypsum cement and alginate. In another embodiment, the lateral alar fibro-fatty tissue 30 comprises about 50% PlatSil Gel 10 and about 50% polyfiber. The cartilage-simulating structures 95 may further comprise the addition of a dye to simulate the pigmentation of human cartilage. In one particular embodiment, the dye is oil-based, and in a further embodiment, the dye comprises white oil-based pigment. The lateral alar fibro-fatty tissue 30 may also further comprise the addition of a dye to simulate the pigmentation of human lateral alar fibro-fatty tissue. In one particular embodiment, the dye is oil-based, and in a further embodiment, the dye comprises yellow oil-based pigment.

Referring to FIG. 8, the gland-simulating structures 96 are shown and are disposed superficial to the muscle-simulating layer 7. The gland-simulating structures 96 are arranged within the surgical training model 100 such that they are anatomically correct. The gland-simulating structures 96 may include but are not limited to lacrimal glands 104 and parotid glands 49.

The gland-simulating structures 96 may comprise one or more materials, including but not limited to plastics, polymers, composites, filaments, filaments encompassed, encircled, or embedded within polymer or composite materials, other materials, additives, and/or combinations thereof. In certain embodiments, the gland-simulating structures 96 may comprise elastomeric materials such as, for example, elastomers (synthetic and natural), rubbers (synthetic and natural), polyisobutene, polyisoprene, polysiloxane, polyetherurethane, polyurethane, polyamide, other materials (known or yet-to-be discovered), additives, and/or combinations thereof such that the gland-simulating structures 96 possess similar or the same characteristics, such as substantially the same or similar tensile strength and/or elongation at break point as that of actual glands in humans. In one embodiment, the gland-simulating structures 96 may comprise a mixture of an elastomer and polyamide mesh to a durometer hardness of about 2 to about 3. The polyamide mesh covers the gland-simulating structures 96.

In one embodiment, the lacrimal glands 104 are arranged within the surgical training model 100 in the anterior, superior, temporal region of the eye socket, as depicted in FIG. 8. More specifically, the lacrimal glands 104 are arranged within the surgical training model 100 so that they are about 0.5 mm to about 1 mm from the medial canthus margin. In one particular embodiment, the lacrimal glands 104 comprise a polysiloxane composition. In a further embodiment, the lacrimal glands 104 comprise Dragon Skin® 10 Fast.

The parotid glands 49 are arranged within the surgical training model 100 posterior to the mandibular ramus, anterior and inferior to the ear 78, and extending irregularly from the zygomatic arch to the angle of the mandible. In one embodiment, the parotid glands 49 may comprise a mixture of polysiloxane and deadener in a ratio of 1:230, respectively. In one particular embodiment, the parotid glands 49 may comprise a polysiloxane. In a further embodiment, the parotid glands 49 may comprise PlatSil Gel 10. In this particular embodiment, the parotid glands 49 may further comprise polyfibers. In a further embodiment, the parotid glands 49 may comprise a polysiloxane softener, and more particularly, comprises Smith's Deadener. The ratio of PlatSil Gel 10 to Smith's Deadener is approximately 1:230, respectively. In one embodiment, the parotid glands 49 comprise a polyamide mesh to simulate the parotid fascia. In a further embodiment, the polyamide mesh is fabricated over the parotid glands 49.

Pigment may be added to the gland-simulating structures 96 to simulate the desirable color of the human parotid glands and lacrimal glands. In one particular embodiment, yellow and red oil-based pigments may be added.

The gland-simulating structures 96 further comprises parotid duct-simulating structures 105. In one particular embodiment, the parotid duct-simulating structures 49.1 are arranged within the superior lobe of the parotid glands 49 such that they pass through the buccinator 20 and are anatomically correct.

The parotid duct-simulating structures 105 may comprise a mixture of an elastomer and polyamide mesh to a durometer hardness of about 2 to about 3. The elastomer of the duct-simulating structures may comprise natural elastomers, synthetic elastomers, and combinations thereof. As set forth above with reference to the other layers and structures, the parotid duct-simulating structures 105 may comprise elastomeric materials such as, for example, elastomers (synthetic and natural), rubbers (synthetic and natural), polyisobutene, polyisoprene, polysiloxane, polyetherurethane, polyurethane, polyamide, other materials (known or yet-to-be discovered) such as alginate, additives, and/or combinations thereof such that the parotid duct-simulating structures 105 possess similar or the same characteristics, such as substantially the same or similar tensile strength and/or elongation at break point as that of an actual parotoid duct in humans.

In one particular embodiment, the parotid duct-simulating structures 105 comprise polysiloxane and alginate. In a further embodiment, the parotid duct-simulating structures 105 comprise about 60% PlatSil Gel 10 and about 40% alginate. Pigment may be added to the parotid duct-simulating structures 105 to simulate the desirable color of the human ducts. In one particular embodiment, yellow and red oil-based pigments are added.

The skull-simulating (and/or skeleton-simulating) structure 8 is subjacent to the muscle-simulating layer 7. In one embodiment, the skull-simulating structure 8 comprises gypsum cement. In another embodiment, the skull-simulating structure has a thickness of about 4 mm to about 6 mm. Pigment may be added to the skull-simulating structure 8 to simulate the desirable color of the human skull. In one particular embodiment, white oil-based pigment is added. In one particular embodiment, the skull-simulating structure 8 comprises two halves: an anterior half 81 and a posterior half 82. Subjacent to the skull-simulating structure 8 is a rigid support layer 9. The rigid support layer comprises a rigid foam capable of expansion. Upon inserting the skull-simulating structure 8 in its correct anatomical position in the surgical training model 100, a rigid foam capable of expansion is inserted into the surgical training model 100. The rigid foam capable of expansion forms a rigid support layer 9 subjacent to the skull-simulating structure 8. In this particular embodiment, the rigid foam comprises a rigid polyfoam, and more particularly comprises a rigid polyurethane foam. Upon expansion of the rigid foam, the skull-simulating structure 8 compresses all tissue-simulating layers superficial to the skull-simulating structure 8. It is understood that the skull-simulating structure 8 may be fabricated from other materials such as plastics, polymers, metals, composites, cements, any other conventional and yet-to-be developed materials, and/or combinations thereof.

In one particular embodiment, the skull-simulating structure 8 may comprise a periosteum-simulating layer 65. The periosteum-simulating layer 65 may comprise a polyamide, and may more particularly comprise polyamide mesh. In one embodiment, the periosteum-simulating layer 65 may be laminated onto the skull-simulating structure 8 while the skull-simulating structure 8 is still tacky, so that the polyamide mesh covers the skull-simulating structure 8. The periosteum-simulating layer 65 may comprise a variety of materials, including but not limited to polymers, elastomers (synthetic and natural), rubbers (synthetic and natural), polyisobutene, polyisoprene, polysiloxane, polyetherurethane, polyurethane, polyamide, other materials (known or yet-to-be discovered), additives, and/or combinations thereof such that the periosteum-simulating layer 65 possesses similar or the same characteristics, such as substantially the same or similar tensile strength and/or elongation at break point as that of an actual periosteum tissue in humans.

In another embodiment, the skull-simulating structure 8 may comprise a galea aponeurotica-simulating structure 40. The galea aponeurotica-simulating structure 40 may comprise a polyamide and an elastomer. In yet a further embodiment, the galea aponeurotica 40 comprises polyamide mesh and polysiloxane. In still a further embodiment, the galea aponeurotica 40 comprises 30 Denier Polyamide and Dragon Skin® 10 Fast. The galea aponeurotica-simulating structure 40 may be laminated onto the skull-simulating structure 8, in its correct anatomical position. The galea aponeurotica-simulating structure 40 may comprise a variety of materials, including but not limited to polymers, elastomers (synthetic and natural), rubbers (synthetic and natural), polyisobutene, polyisoprene, polysiloxane, polyetherurethane, polyurethane, polyamide, other materials (known or yet-to-be discovered), additives, and/or combinations thereof such that the galea aponeurotica-simulating structure 40 possesses similar or the same characteristics, such as substantially the same or similar tensile strength and/or elongation at break point as that of an actual galea aponeurotica tissue in humans.

Figure 9A:
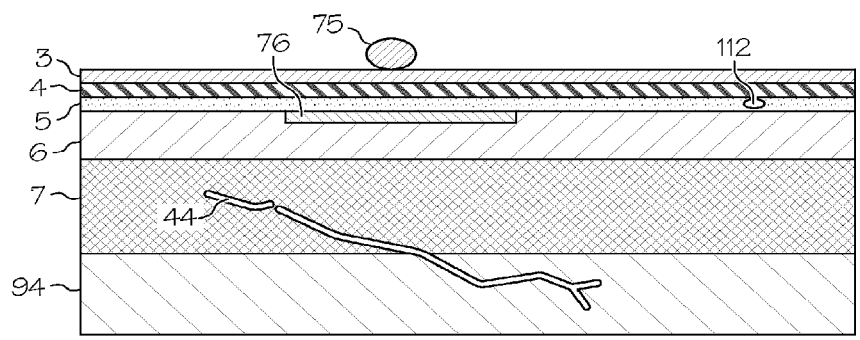
FIG. 9A is a cross-sectional diagram of the layers of the training model taken along line 45 in FIG. 8.
Figure 9B:
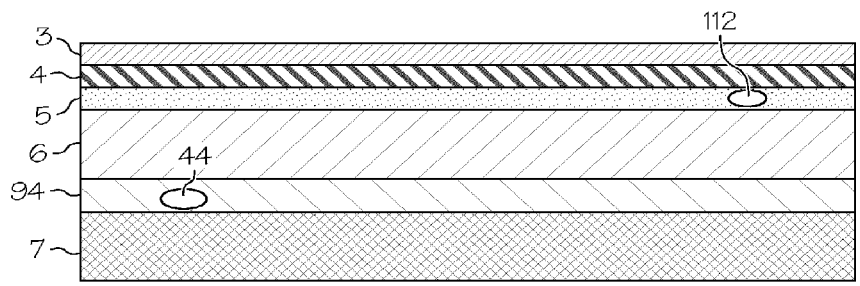
FIG. 9B is a cross-sectional diagram of the layers of the training model taken along line 46 in FIG. 8.

Referring to FIGS. 9A and 9B, cross-sectional diagrams of the layers of the surgical training model 100 taken along lines 45 and 46 are depicted. More particularly, FIG. 9A depicts the tumor 75, the tumor margin 76, the epidermis-simulating layer 3, the upper dermis-simulating layer 4, the lower dermis-simulating layer 5, a blood vessel-simulating structure embedded within the lower dermis-simulating layer 5, the subcutaneous-simulating layer 6, the muscle-simulating layer 7, the temporal nerve 44, and the superficial musculoaponeurotic system-simulating layer 94. In this embodiment, the superficial musculoaponeurotic system-simulating layer 94 is subjacent to the muscle-simulating layer 7 and to the temporal nerve 44. More particularly, FIG. 9B depicts the epidermis-simulating layer 3, the upper dermis-simulating layer 4, the lower dermis-simulating layer 5, a blood vessel-simulating structure embedded within the lower dermis-simulating layer 5, the subcutaneous-simulating layer 6, the superficial musculoaponeurotic system-simulating layer 94, the temporal nerve 44, and the muscle-simulating layer 7. In this particular embodiment, the superficial musculoaponeurotic system-simulating layer 94 is superficial to the muscle-simulating layer 7 and to the temporal nerve 44.

Figure 10:
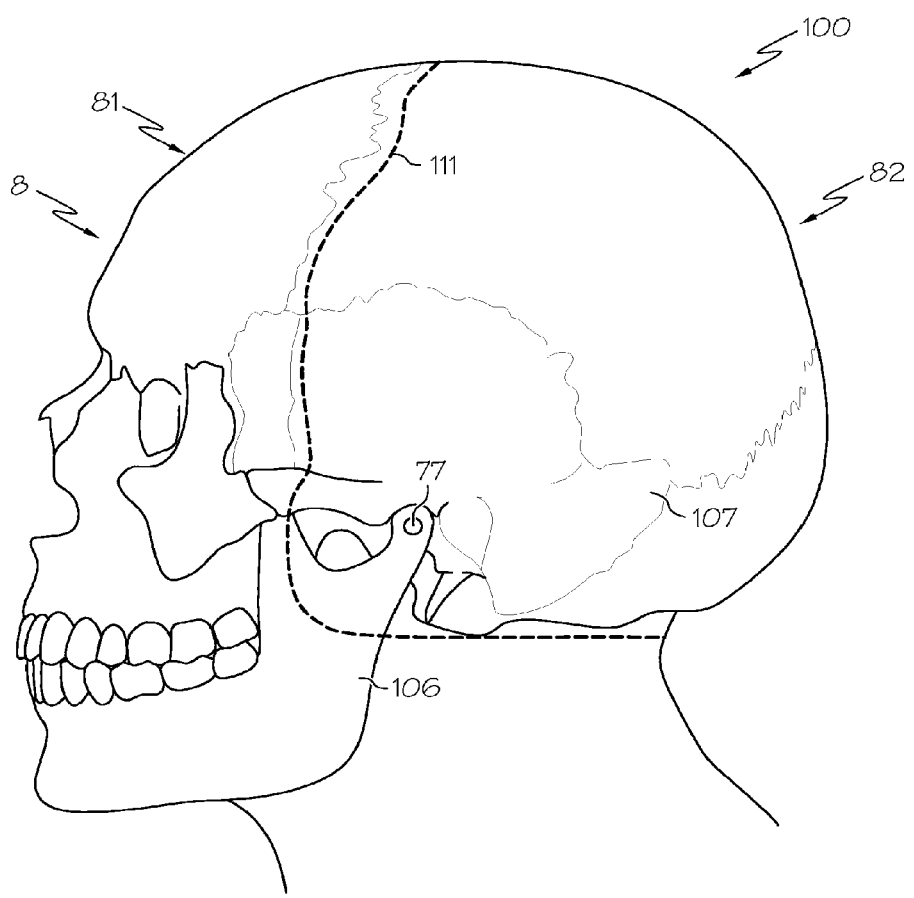
FIG. 10 is a side elevational view of a skull-simulating structure depicting a hinged mandibular joint according to one embodiment.

Referring now to FIG. 10, in one particular embodiment, the skull-simulating structure 8 comprises a hinging device 83. The hinging device 83 may be attached to the superior mandible 106 and temporal bones 107 such that in one embodiment of the surgical training model 100, the mouth 80 may be opened and closed. In one embodiment, the surgical training model 100 may also comprises synthetic teeth (not shown), lip-simulating structures (80, FIG. 1), and/or a tongue-simulating structure (not shown). This embodiment would be useful for providing a training model for dental and/or oral cavity procedures such as, for example, tooth removal, repair, or replacement, oral surgeries, jaw reconstruction procedures, root canals, gum restoration, tongue surgeries, etc.

Additionally, further embodiments of the surgical training model 100 comprise the addition of synthetic eyes 77, eyebrows 108, eyelashes 109, and/or pigmentation to the tumors 75, and combinations thereof. In one embodiment, the surgical training model 100 may comprise open eyes 77; in an alternative embodiment, the surgical training model may comprise closed eyes 77. In still another embodiment, synthetic blood is injected into blood vessel-simulating structures 112 and artery-simulating structures 90 to simulate bleeding on the performance of surgical techniques upon the surgical training model 100. In one embodiment, the surgical training model may comprise a storage container (not shown) that may hold a liquid (i.e., blood-simulating fluid) that simulates blood and a pumping device (not shown) that may be manually or automatically (motor or other actuators) operated in order to move the liquid through the blood-simulating structures. As such, the blood-simulating structures would comprise channels, tubes, or other fluid carriers within the layers of the model in order to deliver and hold the blood-simulating fluid.

The surgical training model 100 may further comprise the addition of a support structure (not shown). The support structure may be inserted into the head and neck of the surgical training model. The support structure may be composed of metals, plastics, or polymers, and combinations thereof, as well as any other materials which may serve to support the head and neck of the surgical training model 100. The support structure may be attached to the head 74 and to the neck 84 of the surgical training model 100 with any suitable means of attachment. In one embodiment, suitable means of attachment include but should not be limited to screws, nails, clips, clamps, and/or welds.

In one particular embodiment of the surgical training model 100, the support structure may further comprise the addition of a mounting device (not shown). The mounting device may be attached to the support structure, wherein the surgical training model 100 may be affixed to a solid support or platform wherein surgical techniques may be performed. The mounting device may include but should not be limited to clips, clamps (e.g., screw clamps), other mounting devices and combinations thereof.

The support structure may further comprise a pivoting device (not shown). The pivoting device may be attached to the head of the surgical training model 100 so that the head 74 of the surgical training model may rotate about the pivoting device. The pivoting device may comprise any pivoting means about which the head of the structure may pivot, including but not limited to joints, ball/socket pivots, swivel shower heads, and other conventional pivoting joints providing one or more degrees of motion.

The present invention also relates to a method of building a surgical training model 100. The method of building comprises laminating various tissue-simulating layers onto a negative mold 1 from the outermost layer inward to the innermost layer. Alternatively, the surgical training model 100 may be fabricated by laminating various tissue-simulating layers onto a sculptured model of the head, neck and shoulders from the innermost layer outward to the outermost layer. As used herein, the term "laminating" means covering with thin layers.

Figure 11:
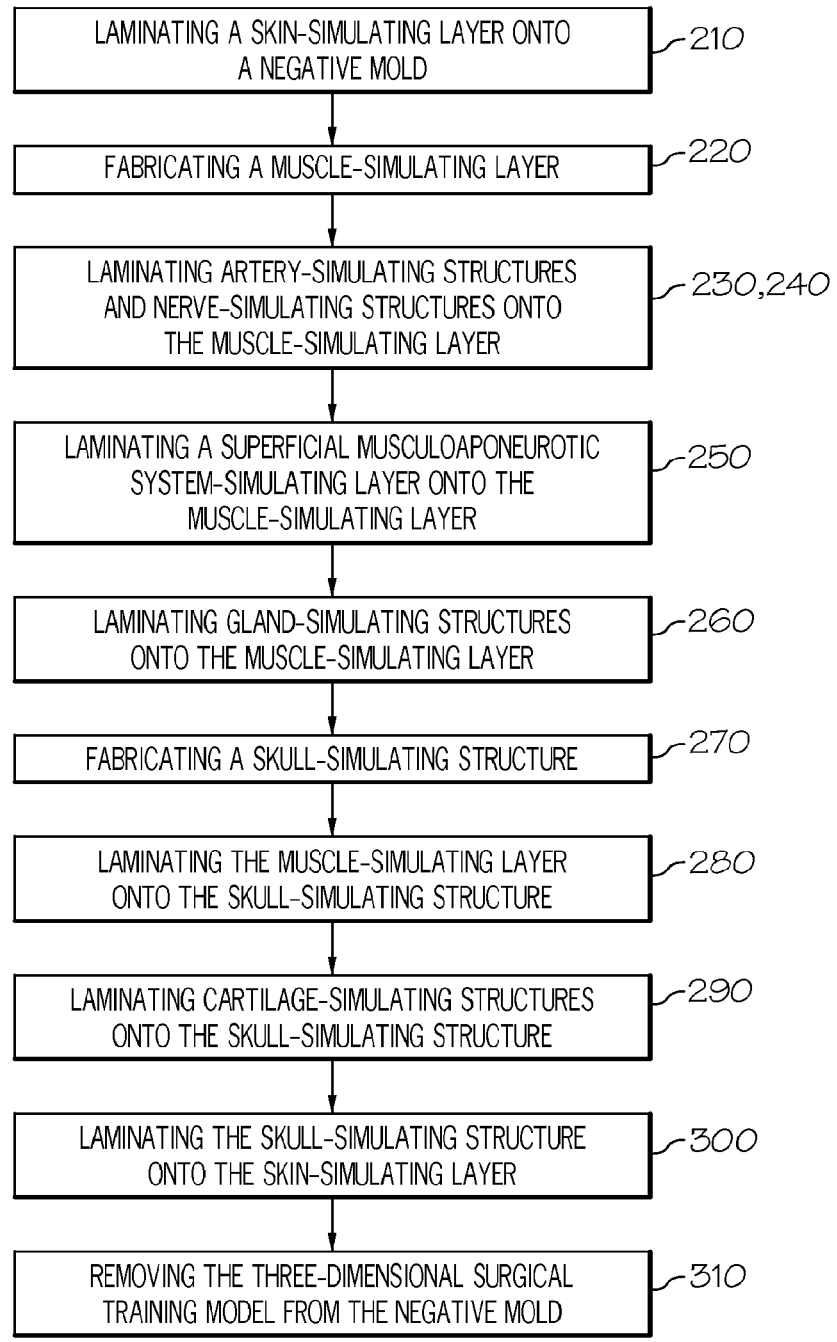
FIG. 11 is a flow chart depicting the method of building a surgical training model.

Referring to FIG. 11, the method of building a surgical training model 100 from a negative mold, comprises: laminating a skin-simulating layer 2 into the negative mold 1 (step 210), fabricating a muscle-simulating layer 7 (step 220), laminating artery-simulating structures 90 onto the muscle-simulating layer 7 (step 230), laminating nerve-simulating structures 93 onto the muscle-simulating layer 7 (step 240), laminating a superficial musculoaponeurotic system-simulating structure 94 onto the muscle-simulating layer 7 (step 250), laminating gland-simulating structures 96 onto the skin-simulating layer 2 (step 260), fabricating a skull-simulating structure 8 (step 270), laminating the muscle-simulating layer 7 onto the skull-simulating structure 8 (step 280), laminating cartilage-simulating structures 95 onto the skull-simulating structure 8 (step 290), laminating the skull-simulating structure 8 onto the skin-simulating layer (step 300), and/or removing the surgical training model 100 from the negative mold 1 (step 310), and combinations thereof.

Figure 3:
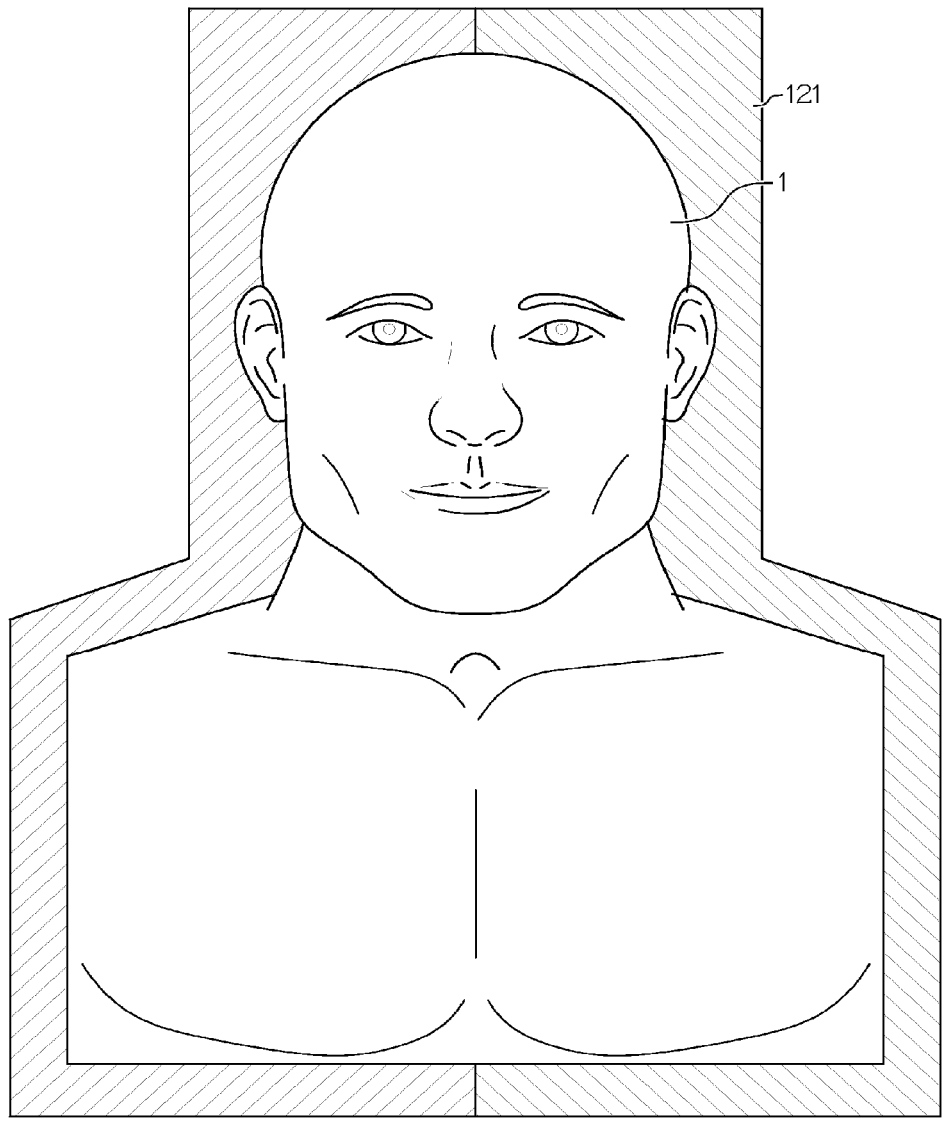
FIG. 3 is a front view of a negative mold of the training model of FIG. 1 with an outer support.
Figure 4A:
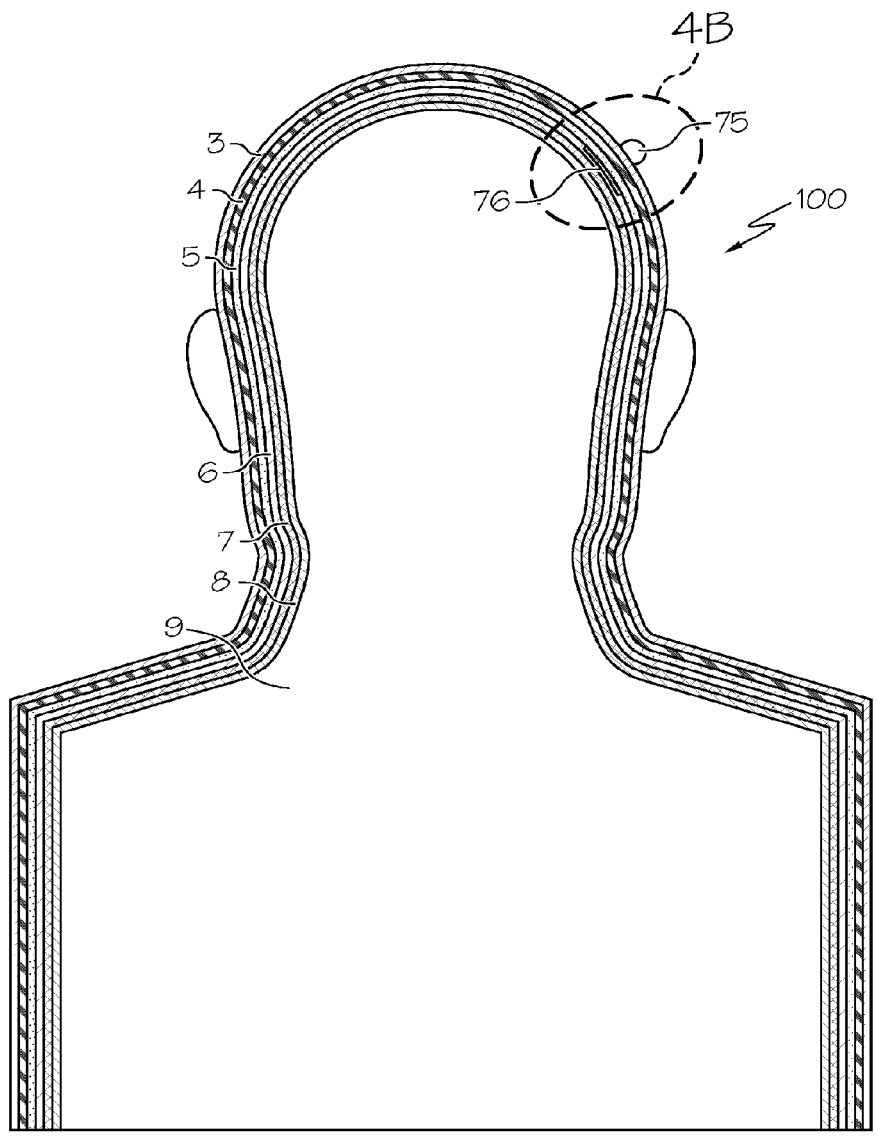
FIG. 4A is a cross-sectional view of the training model of FIG. 1, depicting a variety of layers of the training model.
Figure 4B:
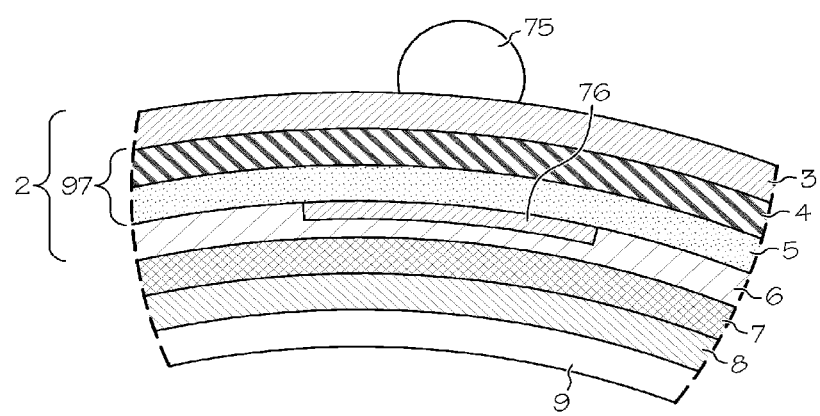
FIG. 4B is a detail view of the training model of FIG. 4A, depicting a variety of layers of the training model.

Referring to FIG. 3, a negative mold 1 is fabricated from a sculptured model of a human head, neck, and shoulders. Alternatively, a negative mold 1 may be fabricated from only the head, or from only the head and neck. In one embodiment, the sculptured model of the head, neck, and shoulders may comprise an oil-based clay. In a further embodiment, cutaneous defect-simulating structures 73 may be carved into the sculptured model of the head, neck, and shoulders. In one particular embodiment, a plurality of cutaneous defect-simulating structures 73 may be carved into high risk areas of the head and neck.

The sculptured model of a human head, neck, and shoulders may comprise that of an adult, child, or infant. The sculptured model of a human head, neck, and shoulders may comprise a male head, neck, and shoulders; alternatively, the sculptured model of the human head, neck, and shoulders may comprise a female head, neck, and shoulders.

The negative mold 1 comprises polyurethane rubber, and, more particularly, the negative mold 1 is fabricated from Poly 74-30. In an alternative embodiment, the negative mold 1 may be prefabricated from a variety of materials, including but not limited to metals, plastics, polymers, composites, any other mold materials, and/or combinations thereof.

In one embodiment, an outer mold 121 is fabricated to support the negative mold 1. In one particular embodiment, the outer mold 121 comprises a polyisocyanate derivative, and more particularly, the outer mold 2 comprises Plasti-Paste™. The outer mold 121 may comprise any material that is strong, durable, and light weight such that it is capable of supporting the negative mold 1. As such, in an alternative embodiment, the outer mold 121 may be prefabricated from a variety of materials, including but not limited to metals, plastics, polymers, composites, any other mold materials, and/or combinations thereof.

The skin-simulating layers 2 are laminated onto the negative mold 1. The skin-simulating layers 2 comprise an epidermis-simulating layer 3, a dermis-simulating layer 97, and a subcutaneous-simulating layer 6. In one particular embodiment, the epidermis-simulating layer 3 comprising a mixture of about 42.5% PlatSil Gel 10 (i.e. about 42.5% of the total volume), about 42.5% Dragon Skin® 10 Fast (i.e. about 42.5% of the total volume), about 10% of about 100% dimethyl silicon fluid (i.e. about 10% of the volume of PlatSil Gel 10 and Dragon Skin® 10 Fast), about 5% Smith's Deadener (i.e. about 5% of the volume of PlatSil Gel 10), and about 1% PlatSil 71 & 73 R Retarder (i.e. about 1% of the volume of PlatSil Gel 10) is laminated onto the negative mold 1 by applying the epidermis-simulating layer 3 composition onto the negative mold 1. In one embodiment, a dye may be added to simulate the pigmentation of human epidermal tissue.

To ensure uniform distribution, the negative mold 1 is rotated. The negative mold 1 may be rotated manually or by use of a machine. In one embodiment, a rotocasting machine may be used. The negative mold 1 should be rotated for approximately thirty minutes. The thickness of the epidermis-simulating layer 3 ranges from about 0.5 mm to about 1.0 mm.

Upon laminating the epidermis-simulating layer 3 onto the negative mold 1, the epidermis-simulating layer 3 should be given time to cure. As previously discussed, where the epidermis-simulating layer 3 comprises a plurality of compounds with different curing times, a retarder may be added to equalize cure times. In one particular embodiment wherein the epidermis-simulating layer 3 comprises PlatSil Gel 10 and Dragon Skin® 10 Fast, PlatSil 71 & 73 R Retarder is added to double the cure time of Dragon Skin® 10 Fast. In this particular embodiment, the epidermis-simulating layer 3 cures in about 8 to about 10 minutes.

While the epidermis-simulating layer 3 is still tacky, a thin layer of polyfiber should be laminated onto the epidermis-simulating layer 3. In one particular embodiment, SF-8 Supreme Polyfiber is used.

The dermis-simulating layer 96 is fabricated in a multi-step process: by laminating the upper dermis-simulating layer 4 onto the epidermis-simulating layer 3, and by fabricating the lower dermis-simulating layer 5 outside of the surgical training model 100 and then laminating the pre-fabricated lower dermis-simulating layer 5 onto the upper dermis-simulating layer 4. In one particular embodiment, the upper dermis-simulating layer 4 comprising a mixture of about 90% Dragon Skin® 10 Fast and about 10% silicone fluid is laminated onto the epidermis-simulating layer 3 by applying the upper dermis-simulating layer 4 composition onto the epidermis-simulating layer 3.

To ensure uniform distribution, the negative mold 1 is rotated after application of the upper dermis-simulating layer 4. The negative mold 1 may be rotated manually or by the use of a machine. In one embodiment, a rotocasting machine may be used. The negative mold 1 should be rotated for approximately thirty minutes.

While the upper dermis-simulating layer 4 is still tacky, a layer of polyfiber is applied onto the upper dermis-simulating layer 4. In one particular embodiment, SF-8 Supreme Polyfiber is used. The upper-dermis simulating layer 4 ranges in thickness from about 0.5 mm to about 1 mm.

The lower dermis-simulating layer 5 is fabricated outside of the surgical training model 100 prior to its lamination onto the upper dermis-simulating layer 4. The lower dermis-simulating layer 5 is pre-fabricated outside of the surgical training model 100 by laminating a lower dermis-simulating composition onto a negative mold 1 of the sculptured model of a human head, neck, and/or shoulders that is approximately about 2 mm to about 3 mm smaller than that of the negative mold 1 comprising the epidermis-simulating layer 3 and the upper dermis-simulating layer 4.

The lower dermis-simulating layer 5 comprises a plurality of layers of polyamide. In one particular embodiment, the lower dermis-simulating layer 5 comprises polyamide mesh that is laminated onto the negative mold with a polysiloxane compound. In a further embodiment, the polyamide mesh is 15 Denier and the polysiloxane compound is Dragon Skin® 10 Fast. In a further embodiment, the lower dermis-simulating layer 5 comprises fourteen layers of polyamide mesh.

In one embodiment, blood vessel-simulating structures 112 are incorporated into the lower dermis-simulating layer 5. Blood vessel-simulating structures are incorporated into the lower dermis-simulating layer 5 by laminating at least one filament onto the lower dermis-simulating layer 5. In one particular embodiment, at least one filament is laminated onto the lower dermis-simulating layer 5 comprising three layers of polyamide mesh.

In a further embodiment, at least one filament is laminated onto the polyamide mesh with a polysiloxane, and more particularly, with Dragon Skin® 10 Fast. After the at least one filament is laminated onto the polyamide mesh, a plurality of layers of polyamide mesh are laminated onto the blood vessel-simulating structures. In one embodiment, the polyamide mesh is laminated onto the blood vessel-simulating structures with Dragon Skin® 10 Fast.

In one particular embodiment, the at least one filament comprises fishing line, and more particularly comprises fifty pound 1 mm monofilament fishing line. The at least one filament remains laminated in the lower dermis-simulating layer 5 until the final layer is laminated onto the surgical training model 100. Dye may be added to the lower dermis-simulating layer 5 to simulate the pigmentation of human dermal tissue. In one particular embodiment, the dye is an oil-based flesh-tone pigment, lighter than the pigmentation of the epidermis-simulating layer.

Upon laminating the lower dermis-simulating layer 5 onto the negative mold, the lower dermis-simulating layer 5 should be given time to cure. Upon curing of the lower dermis-simulating layer 5, tumor margins 76 varying in sizes ranging from about 4 mm to about 15 mm in diameter may be painted. The total thickness of the epidermis-simulating layer 3, the upper dermis-simulating layer 4, and the lower dermis-simulating layer 5 ranges from about 2.0 mm to about 3.5 mm.

Prior to laminating the lower-dermis simulating layer 5 onto the upper dermis-simulating layer 4, the lower dermis-simulating layer 5 is sectioned. In one particular embodiment, the lower dermis-simulating layer 5 is sectioned into two pieces, such that the blood vessel-simulating structures are not severed. The lower-dermis simulating layer 5 is then laminated onto the upper dermis-simulating layer 4. In one embodiment, the lower-dermis simulating layer 5 is laminated onto the upper dermis-simulating layer 4 with Dragon Skin® 10 Fast. The lower-dermis simulating layer 5 is laminated onto the upper dermis-simulating layer 4 by applying Dragon Skin® 10 Fast onto the sectioned lower dermis-simulating layer 5 and allowing the lower-dermis simulating layer 5 time to cure.

The subcutaneous-simulating layer 6 is laminated onto the lower dermis-simulating layer 5. The subcutaneous-simulating layer 6 comprises a polysiloxane. In one embodiment, the subcutaneous-simulating layer 6 comprises a material of low compression and hardness to a durometer reading of 0. In one particular embodiment, the subcutaneous-simulating layer 6 comprises PlatSil Gel 10, Smith's Deadener, and 10% 100% trimethyl silicone fluid silicone. The mixture is applied to the lower dermis-simulating layer 5 and rotated for uniform distribution. A dye may be added to simulate the pigmentation of human subcutaneous tissue. In one particular embodiment, the dye is oil-based and comprises red and yellow oil-based pigments.

The muscle-simulating layer 7 is fabricated outside of the surgical training model 100 prior to its lamination onto the subcutaneous-simulating layer 6. In one embodiment, the muscle-simulating layer 7 is composed of about 70% PlatSil Gel 10, about 10% Smith's Deadener, about 10% of about 100% trimethyl silicone fluid, and about 10% alginate powder. In this particular embodiment, the muscle-simulating layer 7 composition is applied to a prefabricated mold.

The prefabricated mold may comprise rubbers, plastics, or polymers, and combinations thereof. In one particular embodiment, the prefabricated mold comprises a polyurethane rubber wherein select facial muscles are embodied, including but not limited to the frontal 10, occipital 11, procerus 12, orbicularis oculi 13, transverse nasalis 14, levator labii superioris alaeque 15, levator labii superioris 16, zygomaticus minor 17, zygomaticus major 18, orbiculari oris 19, buccinator 20, depressor anguli oris 21, depressor labii inferioris 22, mentalis 23, and platysma 24.

The artery-simulating structures 90 are individually fabricated prior to being laminated onto the muscle-simulating layer 7. The artery-simulating structures 90 include but should not be limited to the supratrochlear artery 32, supraorbital artery 33, angular artery 36, transverse facial artery 37, superior labial artery 38, and inferior labial artery 39.

The artery-simulating structures 90 are prefabricated in a mold. The artery-simulating structures 90 are individually fabricated using a polysiloxane and a polyamide which encircles the filament. In one particular embodiment, the polysiloxane is Dragon Skin® 10 Fast. The artery-simulating structures 90 are individually composed with Dragon Skin® 10 Fast and polyamide mesh encircling a filament in an artery-simulating mold. In one particular embodiment, the filament comprises fishing line having a 2 mm diameter. Upon curing of the Dragon Skin® 10 Fast, the filament is removed and the hollow artery-simulating structures 90 are laminated onto the muscle-simulating layer 7 in their correct anatomical positions.

In one particular embodiment, the artery-simulating structures 90 are laminated onto the muscle-simulating layer 7 in their correct anatomical positions with a polysiloxane. In a further embodiment, the polysiloxane is PlatSil Gel 10. In still a further embodiment, a portion of the artery-simulating structures 90 is embedded within the muscle-simulating layer 7. A portion of the artery-simulating structures 90 may be embedded within the muscle-simulating layer 7 through an aperture defined by the muscle-simulating layer 7.

The nerve-simulating structures 93 are laminated onto the muscle-simulating layer 7 in their correct anatomical positions. The nerve-simulating structures 93 may include but should not be limited to the temporal 44, zygomatic 48, buccal 50, mandibular 51, cervical 101, auricular 102, spinal accessory 53, and the facial nerve. The branches of the facial nerve 110 include the temporal 44, zygomatic 48, buccal 50, mandibular 51, and cervical 101. The auricular nerve 102 is used to identify the spinal accessory nerve 53 as it emerges from the posterior margin of the sternocleidomastoid muscle 103 and the anterior border of the trapezius muscle 54.

The nerve-simulating structures 93 comprise a filament. In one particular embodiment, the filament is yarn, and in a further embodiment, the yarn is approximately 0.5 mm thick. In still a further embodiment, the yarn is yellow. The nerve-simulating structures 93 are laminated onto the muscle-simulating layer 7 with a polysiloxane. In one particular embodiment, the polysiloxane is Dragon Skin® 10 Fast. The nerve-simulating structures 93 are laminated onto the muscle-simulating layer 7 in their correct anatomical positions with a polysiloxane. In a further embodiment, the polysiloxane is PlatSil Gel 10.

The superficial musculoaponeurotic system-simulating layer is laminated onto the muscle-simulating layer 7 such that it is anatomically correct. In one embodiment, the superficial musculoaponeurotic system-simulating layer 94 is laminated onto the muscle-simulating layer 7, such that the artery-simulating structures 90 and the nerve-simulating structures 93 are in their correct anatomical positions subjacent to or superficial to the superficial musculoaponeurotic system-simulating layer 94.

The superficial musculoaponeurotic system-simulating layer 94 comprises an polysiloxane and polyamide mesh. In one embodiment, the polysiloxane is Dragon Skin® 10 Fast. In another embodiment, the polyamide comprises 30 Denier Polyamide. The superficial musculoaponeurotic system-simulating layer 94 is laminated over the temporalis muscle, platysma muscle 24, orbicularis oculi muscle 13, occipitofrontalis muscle 11, zygomatici muscle 18, levator labii superioris muscle 16, and temporal branches of the facial nerve. The superficial musculoaponeurotic system-simulating layer 94 is laminated onto the muscle-simulating layer 7 by applying the polyamide mesh and polysiloxane to the muscle-simulating layer 7 while the polyamide mesh and polysiloxane are still tacky.

The muscle-simulating layer 7 is laminated onto the skull-simulating structure 8 prior to laminating the muscle-simulating layer 7 onto the subcutaneous-simulating layer 6. The muscle-simulating layer 7 is laminated onto the skull-simulating structures such that the artery-simulating structures 90, the nerve-simulating structures 93 and the superficial musculoaponeurotic system-simulating layer 94 are substantially anatomically correct. In one embodiment, the muscle-simulating layer 7 is laminated onto the skull-simulating structure 8 such that the blood artery-simulating structures 90, the nerve-simulating structures 93, and the superficial musculoaponeurotic system-simulating layer 94 are substantially superficial to the muscle-simulating layer 7 and the skull-simulating structure 8. A dye may be added to simulate the pigmentation of human muscle tissue. In one particular embodiment, the dye is oil-based and comprises red and brown oil-based pigments.

In one embodiment, the muscle-simulating layer 7 is laminated onto the skull-simulating structure 8 with a polysiloxane. In a further embodiment, the polysiloxane is PlatSil Gel 10.

The cartilage-simulating structures 95 are fabricated outside of the surgical training model 100 prior to being laminated onto the skull-simulating structure 8 in their correct anatomical positions. The cartilage-simulating structures 95 comprise nasal cartilage 120 and auricular cartilage (not shown). The nasal cartilage 120 may include but should not be limited to septal cartilage 26, lateral crus of the major alar cartilage 27, minor alar cartilage 28, septal cartilage 31, and lateral alar fibro-fatty tissue 30. The nasal cartilage 120 and auricular cartilage are fabricated in a nasal mold and an auricular mold, respectively. In one particular embodiment, the mold may comprise a polyurethane material.

The nasal cartilage 120 comprises a polysiloxane, gypsum cement, and alginate. In a further embodiment, the nasal cartilage comprises about 50% PlatSil Gel 10, about 25% gypsum cement, and about 25% alginate. The auricular cartilage may comprise the same mixture as the nasal cartilage. The lateral alar fibro-fatty tissue 30 is composed of a polysiloxane and polyfiber. In one particular embodiment, the lateral alar fibro-fatty tissue 30 comprises about 50% PlatSil Gel 10 and about 50% polyfiber.

After the cartilage-simulating structures 95 have cured, the composition used to fabricate the muscle-simulating layer 7 is laminated onto the cartilage-simulating structures 95. In one particular embodiment, the negative mold 1 mimics the structure of the muscle-simulating layer 7 and defines apertures through which the cartilage-simulating structures 95 may extend. Thus, in this embodiment, the negative mold 1 covers substantially all of the muscle-simulating layer 7, but does not cover the cartilage-simulating structures 95. As a result, the composition used to fabricate the muscle-simulating layer 7 is easily laminated onto the cartilage-simulating structures 95. After the lamination process is complete, the negative mold 1 may be removed.

After the cartilage-simulating structures 95 are laminated, the cartilage simulating-structures 95 and the muscle-simulating layer 7 may be laminated onto the skull-simulating structure 8. In one particular embodiment, the cartilage-simulating structures 95 are laminated onto the skull-simulating structure 8 with a polysiloxane. In a further embodiment, the polysiloxane is PlatSil Gel 10.

A dye may be added to simulate the pigmentation of human cartilage tissue. In one particular embodiment, the dye is oil-based and comprises white oil-based pigment. A dye may also be added to simulate the pigmentation of human lateral alar fibro-fatty tissue 30. In one embodiment, the dye is oil-based and comprises yellow oil-based pigment.

The gland-simulating structures 96 are fabricated outside of the surgical training model 100 prior to being laminated onto the muscle-simulating layer 7. The gland-simulating structures include but should not be limited to lacrimal glands 104 and parotid glands 49. In one embodiment, the lacrimal glands 104 comprise a polysiloxane, and more specifically comprise Dragon Skin® 10 Fast. The lacrimal glands 104 are fabricated in a lacrimal gland mold. In one embodiment, the lacrimal gland mold comprises a urethane mold. The lacrimal glands 104 are arranged within the surgical training model 100 such that they are superficial to the muscle-simulating layer 7.

In one embodiment, the parotid glands 49 comprise a polysiloxane and a polysiloxane softener. In a further embodiment, the parotid glands 49 comprise PlatSil Gel 10 and Smith's Deadener in a ratio of about 1:230, respectively. The parotid glands 49 may further comprise a polyamide mesh which is applied over the parotid glands 49, to simulate the parotid fascia. The parotid glands 49 are laminated onto the muscle-simulating layer 7 in their correct anatomical position with a polysiloxane. The parotid glands 49 are arranged within the surgical training model 100 such that they are superficial to the muscle-simulating layer 7.

The gland-simulating structures 96 may further comprise parotid duct-simulating structures 105. The parotid duct-simulating structures 105 may comprise a polysiloxane and alginate. In one particular embodiment, the parotid duct-simulating structures 105 comprise a polysiloxane, and more particularly comprise PlatSil Gel 10. In a further embodiment, the parotid duct-simulating structures 105 comprise about 60% PlatSil Gel 10 and about 40% alginate. The parotid duct-simulating structures 105 are fabricated in a tubular mold. After the parotid duct-simulating structures 105 have cured, they are arranged within the superior lobe of the parotid gland 49 such that they pass through the buccinator 20 and are anatomically correct. The parotid duct-simulating structures 105 pass through the buccinator 20 through an aperture defined by the buccinator 20. The parotid duct-simulating structures 105 may be adhered to the parotid glands 49 with a polysiloxane. In one particular embodiment, the polysiloxane is PlatSil Gel 10.

Upon curing, the lacrimal glands 104 and parotid glands 49 are laminated onto the muscle-simulating layer 7 in their correct anatomical positions. The lacrimal glands 104 are arranged within the anterior, superior, temporal region of the eye socket. The parotid glands 49 are arranged so that they are posterior to the mandibular ramus, anterior and inferior to the ear 78, and extend irregularly from the zygomatic arch to the angle of the mandible 106. Dye may be added to the lacrimal glands 104 and the parotid glands 49 to simulate the color of human lacrimal glands 104 and human parotid glands 49, respectively. In one particular embodiment, the dye comprises yellow and red oil-based pigments. The gland-simulating structures 96 are laminated onto the muscle-simulating layer 7 in their correct anatomical position with a polysiloxane. In one particular embodiment, the gland-simulating structures 96 are laminated onto the muscle-simulating layer 7 with a polysiloxane, and in a more particular embodiment, the gland-simulating structures 96 are laminated onto the muscle-simulating layer 7 with PlatSil Gel 10.

The skull-simulating structure 8 comprises gypsum cement. In one embodiment, the skull-simulating structure 8 is fabricated in a polyurethane mold. In a further embodiment, the skull-simulating structure 8 is fabricated in sections, and more particularly, is fabricated in two sections. In this embodiment, the skull-simulating structure 8 is fabricated in an anterior section 81 and a posterior section 82. The skull-simulating structure 8 is fabricated in an anterior section 81 and a posterior section 82 along the broken line 111 in FIG. 10.

In one particular embodiment, a periosteum-simulating layer 65 may be laminated onto the skull-simulating structure 8 in its correct anatomical position. The periosteum-simulating layer 65 may be laminated onto the skull-simulating structure 8 with an polysiloxane. In one particular embodiment, the polysiloxane is PlatSil Gel 10.

In one particular embodiment, a galea aponeurotica-simulating structure 40 may be laminated onto the skull-simulating structure 8, in its correct anatomical position. In a further embodiment, the galea aponeurotica 40 comprises a polyamide mesh and polysiloxane. In yet a further embodiment, the galea aponeurotica 40 comprises 30 Denier Polyamide and Dragon Skin® 10 Fast.

The muscle-simulating layer 7 is then laminated onto the skull-simulating structure 8, and the skull-simulating structure 8 and muscle-simulating layer 7 are laminated onto the subcutaneous-simulating layer 6 of the surgical training model 100. After the skull-simulating structure 8 is laminated onto the muscle-simulating layer 7, a rigid foam capable of expansion is applied to the surgical training model 100. By fabricating the skull-simulating structure 8 in sections, a rigid foam may be added to the skull-simulating structure 8 which may expand to compress the tissue-simulating layers superficial to the skull-simulating structure 8. The rigid foam comprises a rigid support layer 9. In one particular embodiment, the rigid foam is a rigid polyurethane foam.

Upon curing of the rigid foam, the surgical training model 100 may be removed from the negative mold 1. In one particular embodiment, the rigid support layer 9 cures in approximately 30 minutes.

In one embodiment, a hinging device 83 is added to the skull-simulating structure. In a further embodiment, the hinging device 83 is attached to the superior mandible 106 and to the temporal bones 107 so that the mouth 80 of the surgical training model 100 may be opened and closed.

The present invention further comprises a method of training medical practitioners, and more specifically surgical residents and fellows, in a variety of surgical techniques. The method comprises providing a surgical training model 100 and performing surgical techniques upon the surgical training model 100. In one particular embodiment, the method of training comprises the use of a surgical training model 100 to train surgical residents and fellows how to perform a variety of surgical techniques, including but not limited to excision techniques, closure techniques, and cosmetic procedures, and combinations thereof.

In one embodiment, the method of training medical practitioners comprises providing a surgical training model 100 comprising a variety of cutaneous defect-simulating structures 73. Surgical residents and fellows may then perform excision techniques upon the surgical training model 100 to remove one or more of the cutaneous defect-simulating structures 73. Following excision of the cutaneous defect-simulating structures, surgical residents and fellows may perform closure techniques to close the opening wherein the cutaneous defect-simulating structures 73 were excised.

Closure techniques may include but should not be limited to flap and graft closures. In one embodiment, flap closures may comprise single and double advancement flaps, rotational flaps, hinge flaps, bilobed transpositional flaps, forehead flaps, rhomboid flaps, Z-plasty flaps, nasolabial tranpositional flaps, and Estlander flaps. In an alternative embodiment, graft closures may comprise island pedicle grafts and full thickness skin grafts. Additionally, the closure techniques may further comprise primary closures and resections. In a further embodiment, resections may comprise a wedge-shape resection.

Figure 12A:
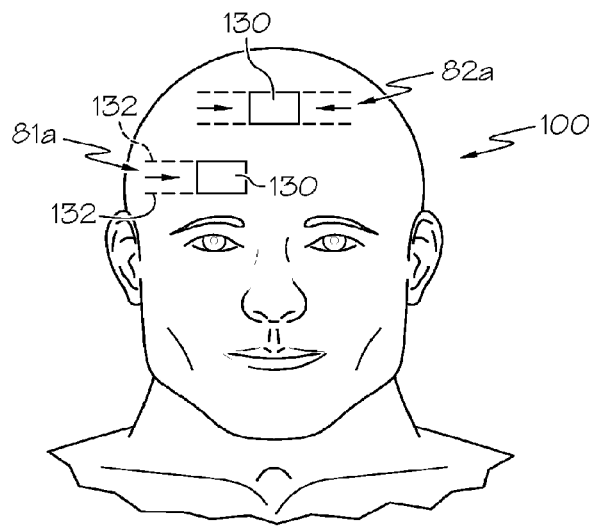
FIG. 12A is a schematic representation of a step of single and double advancement flap procedures being performed on the training model of FIG. 1, wherein a cutaneous defect-simulating structure is removed using a rectangular excision.
Figure 12B:
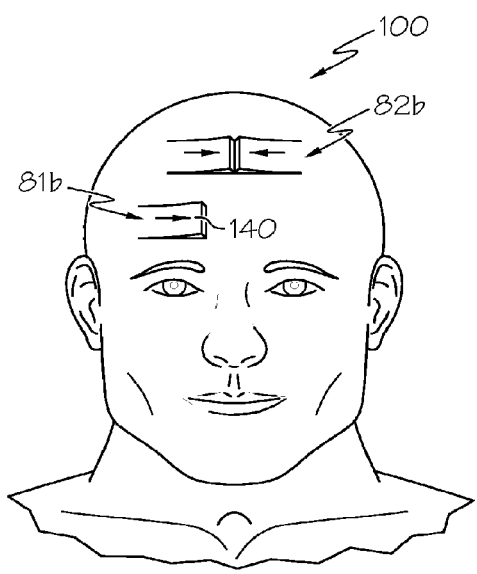
FIG. 12B is a schematic representation of a step of single and double advancement flap procedures being performed on the training model of FIG. 1, wherein parallel incisions are extended from the rectangular excision.
Figure 12C:
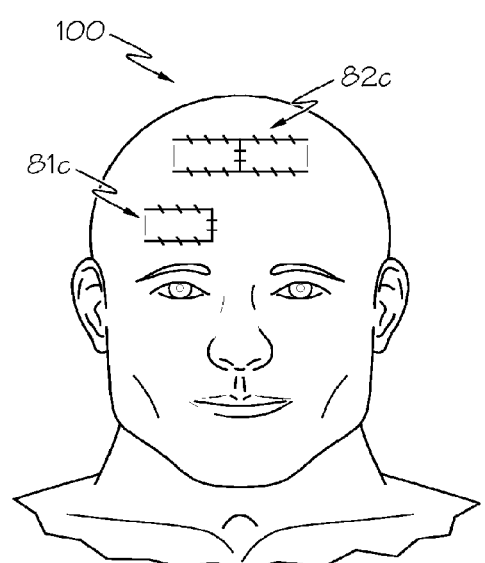
FIG. 12C is a schematic representation of a step of single and double advancement flap procedures being performed on the training model of FIG. 1, wherein the wound is closed.

Referring to FIGS. 12(A)-(C), two examples of surgical procedures are shown that may be performed using the surgical training model 100. The first example comprises a single advancement flap procedure comprising the steps of 81a, 81b and 81c. In step 81a, a cutaneous defect-simulating structure is removed using a rectangular excision 130. Off of the rectangular excision 130, parallel incisions 132 will be extended from one end of the rectangular excision 130. The parallel incisions 132 extend in line with the top and bottom of the rectangular excision 130 as designated by broken lines 132, creating a cantilevered-flap 140. The cantilevered-flap 140 is then stretched across the rectangular excision 130 as shown in 81b. While holding the stretched cantilevered-flap 140, all edges of the flap 140 are sutured thus closing the wound as shown in step 81c. Alternatively, if the cutaneous defect-simulating structure is difficult to close, a double advancement flap procedure may be performed on the rectangular excision 130, as shown in steps 82a, 82b and 82c. The double advancement flap procedure comprises the same steps as set forth above with reference to the single advancement flap procedure, but duplicated on the opposite side of the rectangular excision 130.

Figure 13A:
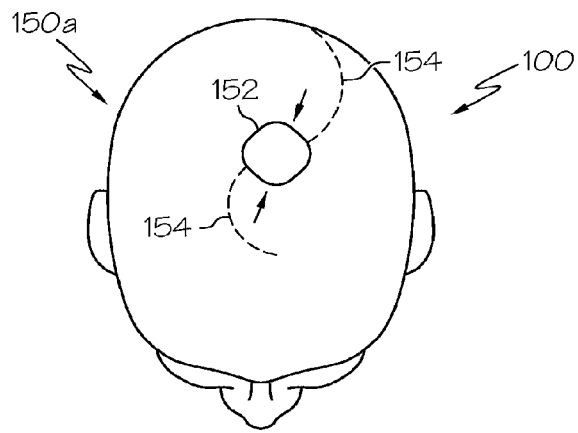
FIG. 13A is a schematic representation of a step of a rotational flap procedure being performed on the training model of FIG. 1, wherein a cutaneous defect-simulating structure is removed using a circular incision.
Figure 13B:
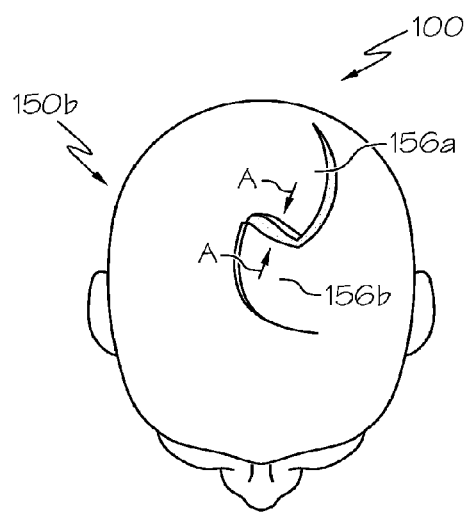
FIG. 13B is a schematic representation of a step of a rotational flap procedure being performed on the training model of FIG. 1, wherein curved incisions are extended from the circular incision.
Figure 13C:
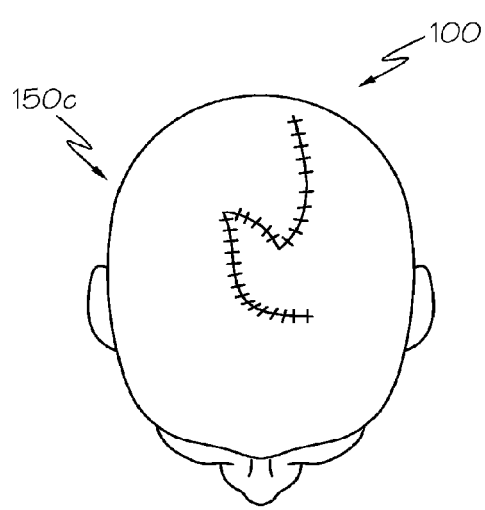
FIG. 13C is a schematic representation of a step of a rotational flap procedure being performed on the training model of FIG. 1, wherein the wound is closed.

Referring to FIGS. 13(A)-(C), an example of a surgical procedure is shown that may be performed using the surgical training model 100. This example comprises a rotational flap procedure comprising the steps of 150a, 150b and 150c. In step 81a, a cutaneous defect-simulating structure is removed using a circular excision 152. Off of the circular excision 152, curved incisions (e.g., arcuate incisions) will be extended from opposite sides of the circular excision 152, as designated by broken lines 154 in step 150a, creating two asymmetrical cantilevered flaps 156a and 156b. The cantilevered-flaps 156a and 156b are then stretched across the circular excision 152 as indicated by the arrows (A) in 150b (e.g., in a substantially angular movement). While holding the stretched cantilevered-flaps 156a and 156b, all edges of the flaps 156a and 156b are sutured thus closing the wound as shown in step 150c.

Figure 14A:
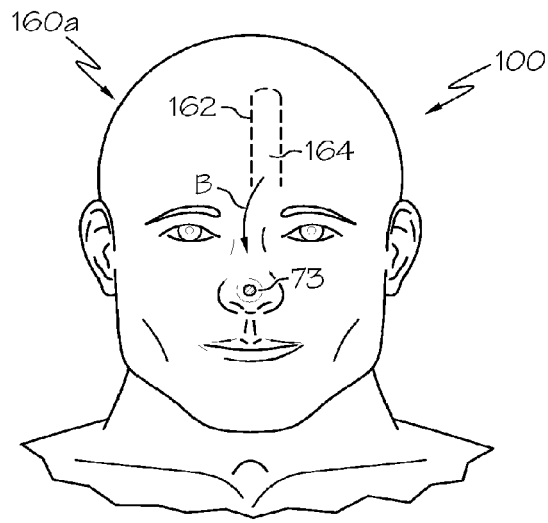
FIG. 14A is a schematic representation of a step of a bilobed transpositional flap procedure being performed on the training model of FIG. 1, wherein incisions in a three-sided rectangular shape are made, creating a cantilevered flap.
Figure 14B:
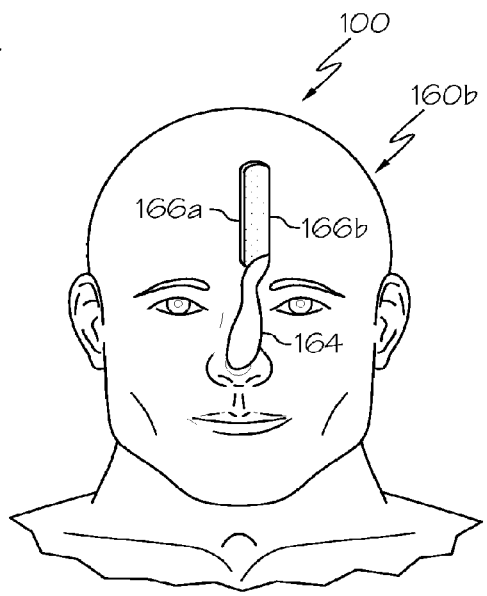
FIG. 14B is a schematic representation of a step of a bilobed transpositional flap procedure being performed on the training model of FIG. 1, wherein the cantilevered flap is extended to cover a cutaneous defect-simulating structure.
Figure 14C:
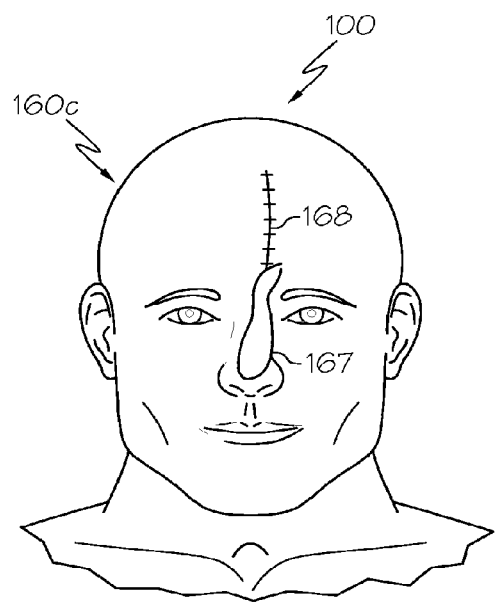
FIG. 14C is a schematic representation of a step of a bilobed transpositional flap procedure being performed on the training model of FIG. 1, wherein sides of the cantilevered flap are sutured.

Referring to FIGS. 14(A)-(C), an example of a surgical procedure is shown that may be performed using the surgical training model 100. This example comprises a transpositional flap procedure comprising the steps of 160a, 160b and 160c. In step 160a, incisions as shown by broken lines 162 in a three-sided rectangular shape are made, creating a cantilevered flap 164. The cantilevered flap 164 will be extended as shown in 160b to cover a cutaneous defect-simulating structure 73. While holding the stretched cantilevered-flap 164, the end and a portion of the sides of the cantilevered flap 164, designated 167 shown in step 160c are sutured. The edges, 166a and 166b, of the wound left by the removal of the cantilevered flap 164 are sutured (sutures 168) together as shown in step 160c.

Figure 15A:
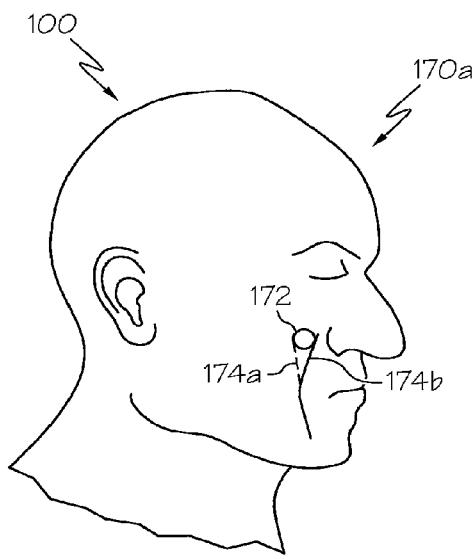
FIG. 15A is a schematic representation of a step of an island pedicle graft, being performed on the training model of FIG. 1, wherein a cutaneous defect-simulating structure is removed using a circular excision.
Figure 15B:
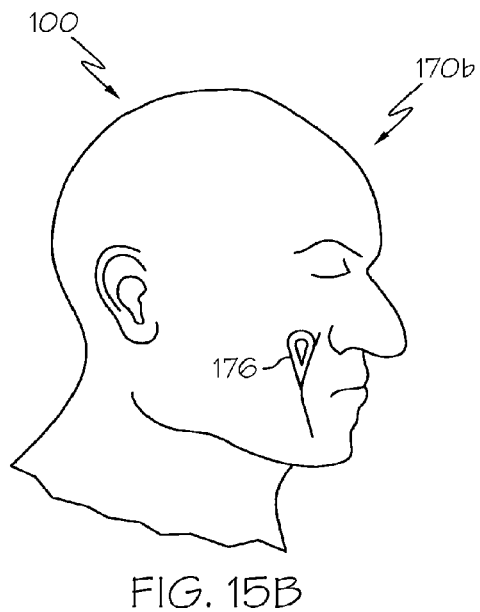
FIG. 15B is a schematic representation of a step of an island pedicle graft, being performed on the training model of FIG. 1, wherein two linear incisions are made off of the same side of the circular excision, removing a triangular-shaped piece of the skin-simulating layer.
Figure 15C:
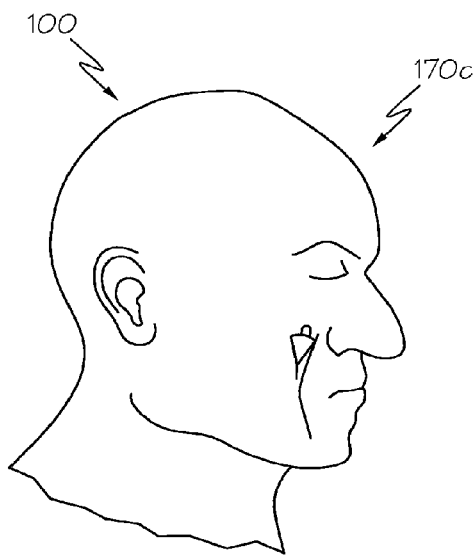
FIG. 15C is a schematic representation of a step of an island pedicle graft, being performed on the training model of FIG. 1, wherein a matching substantially triangular-shaped piece of skin-simulating layer from another area of the training model is grafted into the wound.
Figure 16A:
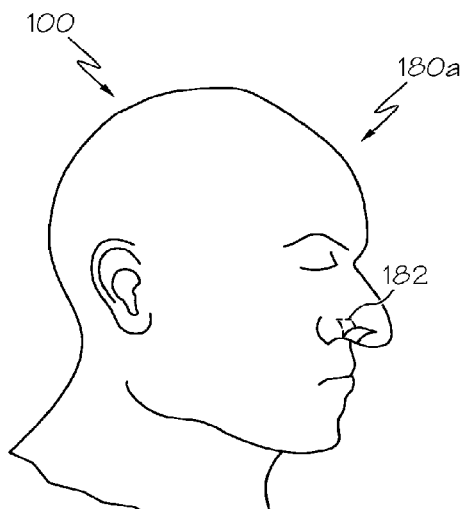
FIG. 16A is a schematic representation of a step of a hinge flap procedure being performed on the training model of FIG. 1, wherein a cutaneous defect-simulating structure is removed using a rectangular excision.
Figure 16B:
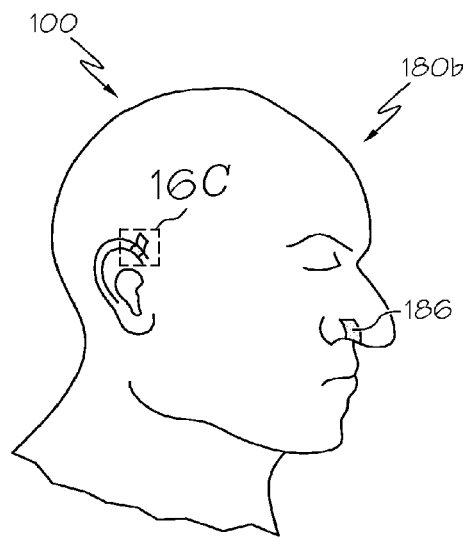
FIG. 16B is a schematic representation of a step of a hinge flap procedure being performed on the training model of FIG. 1, wherein a matching substantially rectangular-shaped graft, as shown in FIG. 16C is excised from another area of the model.
Figure 16D:
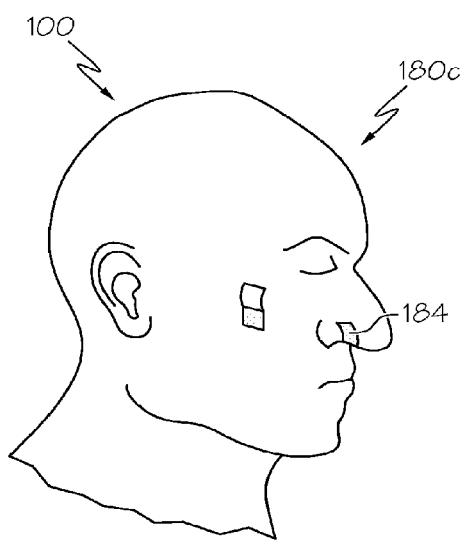
FIG. 16D is a schematic representation of a step of a hinge flap procedure being performed on the training model of FIG. 1, wherein and the graft is grafted onto the wound.
Figure 16C:
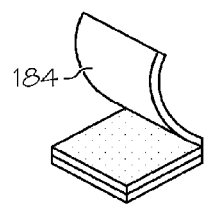
FIG. 16C is a substantially rectangular-shaped graft used in a hinge flap procedure being performed on the training model of FIG. 1.

Referring to FIGS. 15(A)-(C), an example of a surgical procedure is shown that may be performed using the surgical training model 100. This example comprises an island pedicle graft procedure comprising the steps of 170a, 170b and 170c. In step 170a, a cutaneous defect-simulating structure is removed using a circular excision 172. Two linear incisions, 174a and 174b, are made off of the same side of the circular excision 172 and are oriented such that they intersect at ends opposite of the circular excision 172, removing a triangular-shaped piece of the skin-simulating layer 2. A matching substantially triangular-shaped piece of skin-simulating layer from another area of the surgical training model 100 is grafted into the wound 176, as shown in step 170c.

Referring to FIGS. 16(A)-(D), an example of a surgical procedure is shown that may be performed using the surgical training model 100. The example comprises a hinge flap procedure comprising the steps of 180a, 180b and 180c. In step 180a, a cutaneous defect-simulating structure is removed using a rectangular excision 182. A matching substantially rectangular-shaped piece of cartilage-simulating structures 95 and skin-simulating layer 2 (graft 184) are then excised from another area of the surgical training model 100, as shown in step 180b. The graft 184 is then grafted onto the wound 186, as shown in step 180c.

In an alternative embodiment, the method of training medical practitioners to perform surgical techniques involving cosmetic procedures, comprises providing a surgical training model 100, and performing a variety of cosmetic procedures upon the surgical training model 100. The cosmetic procedures may include but should not be limited to facelift, forehead lift, scalp lift, liposuction, injection therapies (e.g. Botox® and fat injection), blepharoplasty, facial implants, birthmark, mole and scar removal, and rhinoplasty.

The invention further comprises a method of using a surgical training model 100. The method of using a surgical training model 100 comprises performing surgical techniques on the surgical training model 100. The method of using a surgical training model 100 may further comprise practicing surgical techniques on the surgical training model 100, and demonstrating surgical techniques on the surgical training model 100.

As previously discussed, surgical techniques performed on the surgical training model 100 may include but should not be limited to excision techniques, closure techniques, and/or cosmetic procedures, and combinations thereof.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A high fidelity skin-simulating layer comprising:
    an epidermis-simulating layer, wherein the epidermis-simulating layer comprises a mixture of a platinum polysiloxane derivative, a silicone rubber, and a polysiloxane softener;
    an upper dermis-simulating layer disposed upon and adjacent to the epidermis-simulating layer, wherein the upper dermis-simulating layer comprises a mixture of a silicone rubber and a polysiloxane softener;
    a lower dermis-simulating layer disposed upon and adjacent to the upper dermis-simulating layer, wherein the lower dermis-simulating layer comprises a plurality of layers of polyamide mesh; and
    a subcutaneous-simulating layer disposed upon and adjacent to the lower dermis-simulating layer, wherein the subcutaneous-simulating layer comprises a mixture of a platinum polysiloxane derivative and a polysiloxane softener.

2. The high fidelity skin-simulating layer of claim 1, wherein the high fidelity skin-simulating layer is shaped to simulate at least one body part.

3. The high fidelity skin-simulating layer of claim 1, further comprising a skeleton-simulating structure, wherein:
    the high fidelity skin-simulating layer is disposed upon the skeleton-simulating structure; and
    the skeleton-simulating structure is shaped to simulate at least one human body part.

4. The high fidelity skin-simulating layer of claim 1, further comprising at least one cartilage-simulating structure, wherein:
    the high fidelity skin-simulating layer is disposed upon the at least one cartilage-simulating structure; and
    the cartilage-simulating structure is shaped to simulate at least one body part.

5. The high fidelity skin-simulating layer of claim 1, further comprising a muscle-simulating layer, wherein the high fidelity skin-simulating layer is disposed upon and adjacent to the muscle-simulating layer.

6. The high fidelity skin-simulating layer of claim 1, wherein the high fidelity skin-simulating layer is incorporated into a three-dimensional surgical training model shaped to simulate at least one human body part.

7. The high fidelity skin-simulating layer of claim 6, wherein the at least one human body part comprises at least one of a human skull, a human neck, human shoulders, human ears, a human nose, or a human mouth.

8. The high fidelity skin-simulating layer of claim 1, wherein the high fidelity skin-simulating layer comprises a tensile strength of from about 16 MPa to about 20 MPa, an elongation at break point of from about 65% to about 75%, and a durometer hardness of from about 4 to about 6.

9. The high fidelity skin-simulating layer of claim 1, wherein the epidermis-simulating layer further comprises a polyfiber layer.

10. The high fidelity skin-simulating layer of claim 1, wherein:
the epidermis-simulating layer comprises the platinum polysiloxane derivative and the silicone rubber in the epidermis-simulating layer in a ratio of 1:1; and
the epidermis-simulating layer has a thickness of from about 0.5 mm to about 1.0 mm, a tensile strength of from about 1 MPa to about 3.4 MPa, and an elongation at break point of from about 700% to about 1100%.

11. The high fidelity skin-simulating layer of claim 1, further comprising cutaneous defect-simulating structures disposed therein, wherein the cutaneous defect-simulating structures are selected from the group consisting of lesions, wounds, cysts, lymphomas and scars and combinations thereof, and wherein at least one of the cutaneous defect-simulating structures protrudes above an outer-most surface of the epidermis-simulating layer.

12. The high fidelity skin-simulating layer of claim 11, wherein:
the lesions comprise tumors and tumor margins;
the epidermis-simulating layer comprises the tumors; and
the epidermis-simulating layer and the lower dermis-simulating layer comprise the tumor margins.

13. The high fidelity skin-simulating layer of claim 1, wherein:
the epidermis-simulating layer comprises about 42.5% by total volume of the platinum polysiloxane derivative and about 42.5% by total volume of the silicone rubber;
the epidermis-simulating layer comprises about 10% by volume of the polysiloxane softener, the volume being the volume of the platinum polysiloxane derivative and the silicone rubber;
the upper dermis-simulating layer comprises about 90% by total volume of the silicone rubber and about 10% by total volume of the polysiloxane softener;
the lower dermis-simulating layer comprises a thickness of about 1.0 mm to about 1.5 mm; and
the lower dermis-simulating layer comprises at least one blood vessel-simulating structure embedded therein such that synthetic blood may be injected into the at least one blood vessel-simulating structure to simulate bleeding upon demonstrating or practicing surgical techniques thereon.

14. A high fidelity skin-simulating layer comprising:
an epidermis-simulating layer, wherein the epidermis-simulating layer comprises a polyfiber layer and a mixture of a polysiloxane and a silicone rubber;
an upper dermis-simulating layer disposed upon and adjacent to the epidermis-simulating layer, wherein the upper dermis-simulating layer comprises a silicone rubber;
a lower dermis-simulating layer disposed upon and adjacent to the upper dermis-simulating layer, wherein the lower dermis-simulating layer comprises a plurality of layers of polyamide mesh; and
a subcutaneous-simulating layer disposed upon and adjacent to the lower dermis-simulating layer, wherein the subcutaneous-simulating layer comprises a mixture of a polysiloxane and a polysiloxane softener.

15. The high fidelity skin-simulating layer of claim 14, wherein the high fidelity skin-simulating layer is shaped to simulate at least one human body part.

16. The high fidelity skin-simulating layer of claim 14, wherein:
the epidermis-simulating layer further comprises a polysiloxane softener;
the upper dermis-simulating layer further comprises a polysiloxane softener; and
the lower dermis-simulating layer further comprises blood vessel-simulating structures disposed therein such that synthetic blood may be injected into the blood vessel-simulating structures to simulate bleeding upon demonstrating or practicing surgical techniques thereon.

17. The high fidelity skin-simulating layer of claim 16, wherein:
the epidermis-simulating layer is an outermost layer of the three-dimensional surgical training model;
the upper dermis-simulating layer is subjacent to the epidermis-simulating layer;
the lower dermis-simulating layer is subjacent to the upper dermis-simulating layer;
the epidermis-simulating layer, the upper dermis-simulating layer, and the lower dermis-simulating layer comprise a total thickness of from about 2.0 mm to about 3.5 mm;
the blood vessel-simulating structures are arranged in correct anatomical positions in the lower dermis-simulating layer;
the subcutaneous-simulating layer is subjacent to the lower dermis-simulating layer; and
the subcutaneous-simulating layer comprises a thickness of from about 1 mm to about 10 mm.

18. The high fidelity skin-simulating layer of claim 16, wherein:
the lower dermis-simulating layer further comprises a silicone rubber; and
the blood vessel-simulating structures are provided as channels defined by the silicone rubber such that the synthetic blood may be injected into the channels.

19. A method of training medical practitioners comprising:
performing a surgical technique upon a high fidelity skin-simulating layer, wherein at least one cutaneous defect-simulating structure is laminated on the high fidelity skin-simulating layer, and wherein the high fidelity skin-simulating layer comprises:
an epidermis-simulating layer, wherein the epidermis-simulating layer comprises a mixture of a platinum polysiloxane derivative, a silicone rubber, and a polysiloxane softener;
an upper dermis-simulating layer disposed upon and adjacent to the epidermis-simulating layer, wherein the upper dermis-simulating layer comprises a mixture of a silicone rubber and a polysiloxane softener;
a lower dermis-simulating layer disposed upon and adjacent to the upper dermis-simulating layer, wherein the lower dermis-simulating layer comprises a plurality of layers of polyamide mesh; and
a subcutaneous-simulating layer disposed upon and adjacent to the lower dermis-simulating layer, wherein the subcutaneous-simulating layer comprises a mixture of a platinum polysiloxane derivative and a polysiloxane softener.

20. The method of training medical practitioners of claim 19, wherein the surgical technique comprises removing the at least one cutaneous defect-simulating structure and closing a wound.

* * * * *